United States Patent
Li et al.

(10) Patent No.: US 11,010,751 B2
(45) Date of Patent: *May 18, 2021

(54) PERFORMING TRANSACTIONS USING VIRTUAL CARD VALUES

(71) Applicant: Advanced New Technologies Co., Ltd., George Town (KY)

(72) Inventors: Jingming Li, Dublin, CA (US); Hui Wu, Hangzhou (CN); Bing Wu, Shanghai (CN)

(73) Assignee: Advanced New Technologies Co., Ltd.

( * ) Notice: Subject to any disclaimer, the term of this patent is extended or adjusted under 35 U.S.C. 154(b) by 115 days.

This patent is subject to a terminal disclaimer.

(21) Appl. No.: 16/230,057

(22) Filed: Dec. 21, 2018

(65) Prior Publication Data

US 2019/0197523 A1 Jun. 27, 2019

Related U.S. Application Data

(63) Continuation of application No. 14/286,163, filed on May 23, 2014, now Pat. No. 10,210,507.

(51) Int. Cl.
*G06Q 40/00* (2012.01)
*G06Q 20/34* (2012.01)
(Continued)

(52) U.S. Cl.
CPC ........... *G06Q 20/351* (2013.01); *G06Q 20/12* (2013.01); *G06Q 20/38* (2013.01); *G06Q 20/40* (2013.01)

(58) Field of Classification Search
CPC ....... G06Q 20/351; G06Q 20/38; G06Q 20/40
See application file for complete search history.

(56) References Cited

U.S. PATENT DOCUMENTS 6,192,142 B1  2/2001  Pare, Jr.
6,227,447 B1  5/2001  Campisano
(Continued)

FOREIGN PATENT DOCUMENTS

JP   2002183443   6/2002
JP   2007241527   9/2007
(Continued)

OTHER PUBLICATIONS

N. Waraporn, M. Sithiyavanich, H. Jiarawattanasawat and N. Pakchai, "Virtual Credit Cards on Mobile for M-Commerce Payment," 2009 IEEE International Conference on e-Business Engineering, Macau, 2009, pp. 241-246, doi: 10.1109/ICEBE.2009.40. (Year: 2009).*

*Primary Examiner* — Rajesh Khattar
(74) *Attorney, Agent, or Firm* — Van Pelt, Yi & James LLP

(57) ABSTRACT

Performing transactions using virtual card values is disclosed, including: generating a virtual card value corresponding to a transaction; sending a request to a card management server, wherein the request includes the virtual card value and a transaction amount corresponding to the transaction; receiving an indication from the card management server that the virtual card value and the transaction amount have been successfully stored; generating a merchant-related locator based at least in part on identifying information associated with a merchant server and the virtual card value; sending the merchant-related locator to a client device; and receiving, from the card management server, a request to transfer the transaction amount from a user account associated with a cardless payment server to a funds account associated with the merchant server.

20 Claims, 14 Drawing Sheets

(51) Int. Cl.
*G06Q 20/38* (2012.01)
*G06Q 20/12* (2012.01)
*G06Q 20/40* (2012.01)

(56) References Cited

U.S. PATENT DOCUMENTS

| | | | |
|---|---|---|---|
| 6,908,030 | B2 | 6/2005 | Rajasekaran |
| 7,529,563 | B1 | 5/2009 | Pitroda |
| 8,121,942 | B2 | 2/2012 | Carlson |
| 8,612,344 | B2 | 12/2013 | Li |
| 10,068,295 | B1 * | 9/2018 | Allen ............... G16H 40/67 |
| 2003/0080183 | A1 | 5/2003 | Rajasekaran |
| 2003/0145205 | A1 | 7/2003 | Sarcanin |
| 2005/0192896 | A1 | 9/2005 | Hutchison |
| 2008/0288404 | A1 | 11/2008 | Pirzadeh |
| 2010/0063906 | A1 | 3/2010 | Nelsen |
| 2010/0076833 | A1 | 3/2010 | Nelsen |
| 2010/0145818 | A1 | 6/2010 | Udiani |
| 2011/0125638 | A1 | 5/2011 | Davis |
| 2012/0072350 | A1 | 3/2012 | Goldthwaite |
| 2012/0310826 | A1 | 12/2012 | Chatterjee |
| 2013/0132274 | A1 | 5/2013 | Henderson |
| 2014/0108263 | A1 | 4/2014 | Ortiz |
| 2014/0249904 | A1 | 9/2014 | Nelsen |
| 2015/0134540 | A1 | 5/2015 | Law |
| 2015/0332251 | A1 * | 11/2015 | Dean ............... G06Q 20/28 705/44 |
| 2015/0339661 | A1 | 11/2015 | Li |
| 2016/0189135 | A1 | 6/2016 | Hird |
| 2016/0224985 | A1 * | 8/2016 | Jo ............... G06Q 20/3278 |
| 2017/0061433 | A1 | 3/2017 | Kulshreshtha |
| 2019/0122215 | A1 * | 4/2019 | Trivedi ............... G06Q 20/3278 |

FOREIGN PATENT DOCUMENTS

| | | |
|---|---|---|
| JP | 2008204248 | 9/2008 |
| JP | 2013218414 | 10/2013 |
| KR | 20100129028 | 12/2010 |
| KR | 20140038698 | 3/2014 |
| WO | 03017031 | 2/2003 |

* cited by examiner

PERFORMING TRANSACTIONS USING VIRTUAL CARD VALUES

CROSS REFERENCE TO OTHER APPLICATIONS

This application is a continuation of co-pending U.S. patent application Ser. No. 14/286,163 entitled PERFORMING TRANSACTIONS USING VIRTUAL CARD VALUES filed May 23, 2014 which is incorporated herein by reference for all purposes.

BACKGROUND OF THE INVENTION

Conventionally, merchants have payment systems that are integrated with several card issuing entities. For example, the card issuing entities may comprise banks and/or credit card companies. The card issuing entities can issue physical cards to customers. For example, when such a card-holding customer desires to make a purchase online, the customer can provide to the merchant the account number and/or card number of either a physical debit card or credit card that was issued to him or her by a card issuing entity. The merchant can use the card information supplied by the customer to charge the purchase amount to the user's account/card. Eventually, the card issuing entity can facilitate the transfer of funds associated with the user's online purchase to the merchant. Signing up for a credit or debit card is typically a process that requires a substantial amount of time and is governed by regulatory requirements. Thus, certain consumers such as people residing overseas may find it difficult to obtain a credit or debit card for making online purchases.

BRIEF DESCRIPTION OF THE DRAWINGS

Various embodiments of the invention are disclosed in the following detailed description and the accompanying drawings.

DETAILED DESCRIPTION

Figure 1:
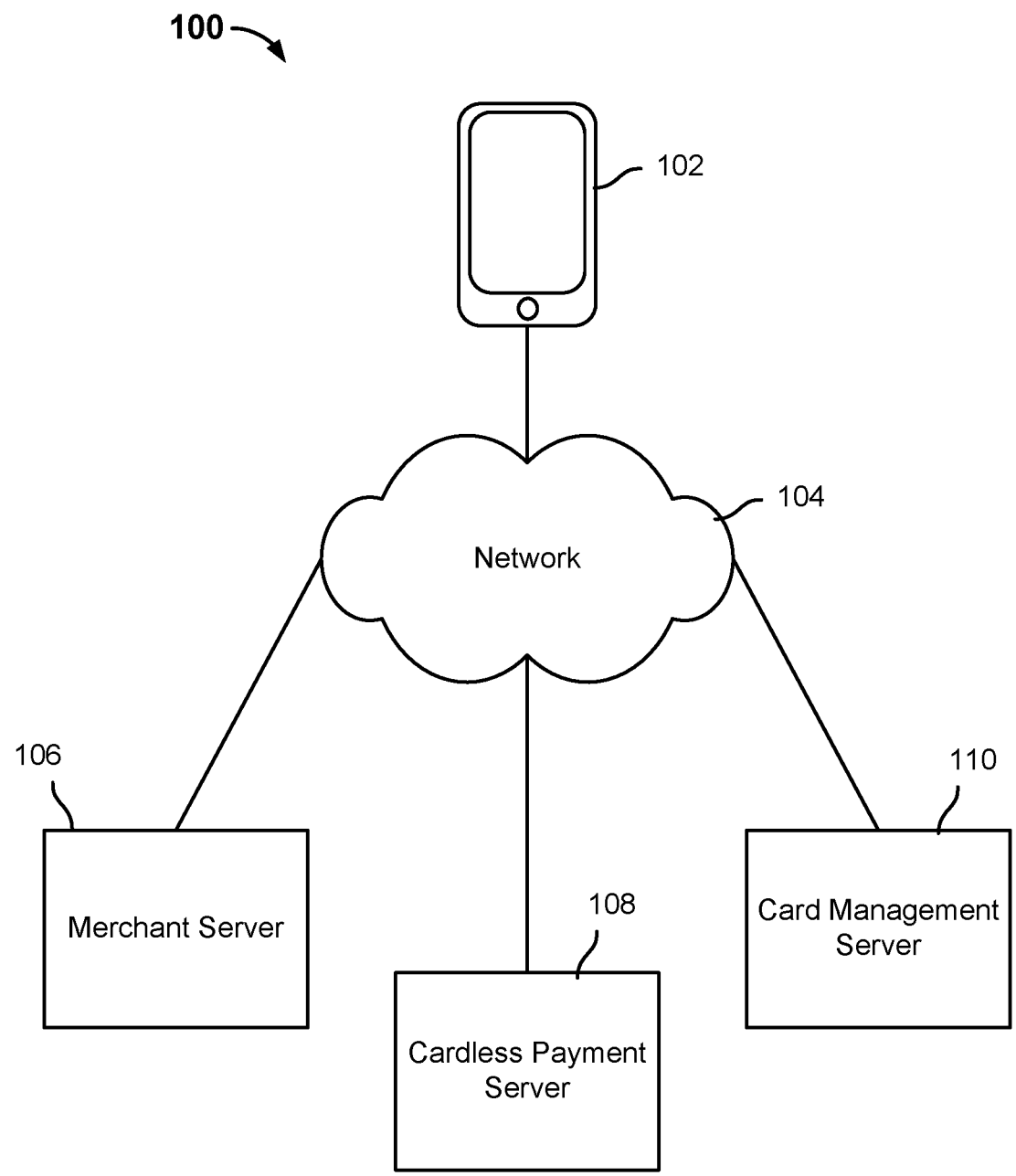
FIG. 1 is a diagram showing an embodiment of a system for performing transactions using virtual card values.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some scenarios, a user of an online e-commerce platform does not have a physical debit or credit card and/or is not eligible to receive a physical debit or credit card (e.g., due to regulatory issues) that is issued by a card management service. Examples of a card management service include a bank or a credit card company. Such types of card management services may have payment systems (e.g., point-of-sale systems, credit card payment terminals, servers) that are traditionally integrated with those of various merchants such that a user who has been issued a physical card by a card management service can make purchase payments to the merchants by providing the account information (e.g., credit card information and/or security number) of his or her respective card. However, a user who does not have a physical debit or credit card and/or is not eligible to receive a physical debit or credit card that is issued by a card management service may not have a convenient alternative method, if one at all, to make purchases with these merchants.

Many users have accounts with online payment platforms. An example of an online payment platform is Alipay®. Conventionally, an online payment platform may not necessarily issue physical cards to its users but may enable a user to make online payments to online merchants that are integrated with the online payment platform via funds that the users associate with their respective user accounts at the online payment platform. For example, to make a purchase at an online merchant, a user of the online payment platform can log in into his or her online payment platform account and select a source of funds from which the purchase amount can be transferred.

However, certain merchants that accept physical cards issued by card management services are not integrated with online payment platforms. As such, conventionally, a user with an account at an online payment platform but without a physical card issued by a card management service may not make purchases from certain merchants whose payment systems have traditionally been integrated with the systems of the card management service but not with the systems of the online payment platform.

Therefore, it is desirable to allow users of an online payment platform to use funds associated with their respective online payment platform accounts to pay a merchant whose systems have not been integrated with those of the online payment platform but have been traditionally integrated with those of one or more card management services. Such transactions can be enabled by configuring a card management server that is traditionally integrated with the merchant server to coordinate with the cardless payment server associated with the online payment platform to issue a virtual card value for each such transaction.

Embodiments of performing transactions using virtual card values are described herein. In various embodiments, a user of an online payment platform may be enabled to pay a merchant for a transaction with funds associated with his or her online payment platform account via a virtual card value issued for the transaction. In various embodiments, a virtual card value comprises a series of alphanumeric characters. In some embodiments, the virtual card value is valid only for a single transaction. In various embodiments, a unique virtual card value is generated for each transaction. In various embodiments, a virtual card value corresponding to the transaction is generated by a cardless payment server. The value is said to be virtual because no actual, physical card needs to be issued. In various embodiments, the cardless payment server can be implemented as a component of an online payment platform. The virtual card value is then used by a card management server that has already been integrated with the merchant to complete the transaction.

FIG. 1 is a diagram showing an embodiment of a system for performing transactions using virtual card values. In the example, system 100 includes client device 102, network 104, merchant server 106, cardless payment server 108, and card management server 110. Network 104 includes one or more high-speed data networks and/or telecommunications networks.

While client device 102 is shown as a smart phone, other examples of client device 102 include a laptop computer, a desktop computer, a mobile device, a tablet device, and/or any computing device. In various embodiments, a web browser application is executing at client device 102. A user, Alice, has already created a user account associated with an online payment platform (e.g., Alipay®) via using the web browser executing at client device 102 to access the website associated with the online payment platform. Furthermore, Alice may have already deposited funds into the account at the online payment platform and/or identified one or more sources of funds to use for future (e.g., online) purchases that will be made using her account with the online payment platform. In various embodiments, cardless payment server 108 is operated at least in part by the online payment platform.

Alice can use the web browser executing at client device 102 to browse an e-commerce website operated by merchant server 106. Merchant server 106 is traditionally integrated with card management server 110, which is associated with a card management service that issues physical credit cards and/or debit cards. An example of a card management service is a credit card company such as Visa®, Mastercard®, Discover®, and American Express®. Because merchant server 106 has already been integrated with card management server 110, a user who has been issued a physical card from the card management service can make a purchase at the website operated by merchant server 106 by submitting the account information associated with the physical card to merchant server 106, which will eventually coordinate the transfer of that user's funds to cover the purchase amount directly with card management server 110. Merchant server 106 has not been integrated with cardless payment server 108 and as such, conventionally, a user with an account at the online payment platform cannot pay funds directly to merchant server 106.

In various embodiments, an arrangement has been made between the online payment platform and the card management service such that the card management server 110 is configured to coordinate with cardless payment server 108 to enable a user with an account at the online payment platform to make a payment to merchant server 106 via a virtual card value recognized by card management server 110.

Therefore, Alice can use her account with the online payment platform associated with cardless payment server 108 to make a purchase at the website operated by merchant server 106 even though cardless payment server 108 has not been integrated with merchant server 106. As will be described in greater detail below, regardless of whether Alice has a physical card issued by the card management service associated with card management server 110, Alice can make a purchase with merchant server 106 using funds associated with her account at the online payment platform.

For example, in response to a selection by Alice at the website operated by merchant server 106 to complete a transaction, the web browser executing at client device 102 sends a payment request to merchant server 106. In response to receipt of the payment request from client device 102, merchant server 106 is configured to redirect the web browser executing at client device 102 to cardless payment server 108. In response to receipt of a request from the web browser executing at client device 102, cardless payment server 108 is configured to send data associated with a page that prompts for user credentials associated with an account at the online payment platform. The web browser executing at client device 102 can present the page that prompts for user credentials (e.g., a login name and a password) associated with an account at the online payment platform to Alice. Alice can then submit her credentials via the web browser executing at client device 102 to cardless payment server 108. In the event that cardless payment server 108 authenticates Alice, cardless payment server 108 generates a (e.g., unique) virtual card value corresponding to this particular transaction of Alice's, as will be described in greater detail below. Cardless payment server 108 then sends the generated virtual card value along with other information regarding the transaction (e.g., the transaction amount, which is the price of the purchase that Alice desires to make) to card management server 110. In various embodiments, cardless payment server 108 does not send any additional user information associated with Alice to card management server 110 with the virtual card value, so as to protect Alice's privacy.

Card management server 110 is configured to store the received virtual card value and transaction information corresponding to the transaction and return an indication to cardless payment server 108 upon successfully storing such information. In response to receipt of the indication that card management server 110 has successfully stored the virtual card value and transaction amount, cardless payment server 108 is configured to send data (e.g., a merchant-related locator) to the web browser executing at client device 102, where the data includes the virtual card value and the transaction amount and is usable to redirect the web browser executing at client device 102 to merchant server 106 and also cause merchant server 106 to send a pre-authorization request including the virtual card value and the transaction amount to card management server 110. In response to receipt of the pre-authorization request from merchant server 106, card management server 110 stores data corresponding to the virtual card value corresponding to the transaction indicating that the transaction amount is authorized to be eventually paid to a funds account associated with merchant server 106. Card management server 110 also sends a pre-authorization confirmation associated with the virtual card value to merchant server 106. In response to receipt of the pre-authorization confirmation from card management server 110, merchant server 106 stores data that the transaction has been completed and sends to the web browser executing at client device 102 data associated with a page that informs Alice that the transaction has been successfully completed.

Eventually (e.g., at a configured time of each day), merchant server 106 sends a capture request that includes the virtual card value corresponding to at least Alice's transaction described above to card management server 110. In response to receipt of the capture request from merchant server 106, card management server 110 sends cardless payment server 108 a request to transfer the transaction amount corresponding to the virtual card value from a source of user funds associated with the virtual card value to a funds account associated with merchant server 106. In response to receipt of the request to transfer funds from card management server 110, cardless payment server 108 is configured to locate a source of funds selected by Alice to apply towards this transaction and send a request (e.g., to the financial institution associated with the located source of user funds or to the online payment system) to transfer the transaction amount from the located source of funds to the funds account associated with merchant server 106.

As such, Alice, who may or may not have a physical card issued by the card management service associated with card management server 110, is enabled to make a purchase with merchant server 106 using her online payment platform account. From the merchant's perspective, it is as if Alice had paid with a physical credit card and/or debit card issued by the card management service associated with card management server 110. From Alice's perspective, it is as if she made a purchase at the website operated by merchant server 106 directly using her online payment platform account and may be unaware that a virtual card value had been generated for her transaction and/or was used with the particular card management service (associated with card management server 110) that had the arrangement with the online payment platform. In some embodiments, if merchant server 106 is traditionally integrated with multiple card management services, then one or more of such card management services can be arranged to coordinate with cardless payment server 108 to use virtual card values as described herein.

Figure 2:
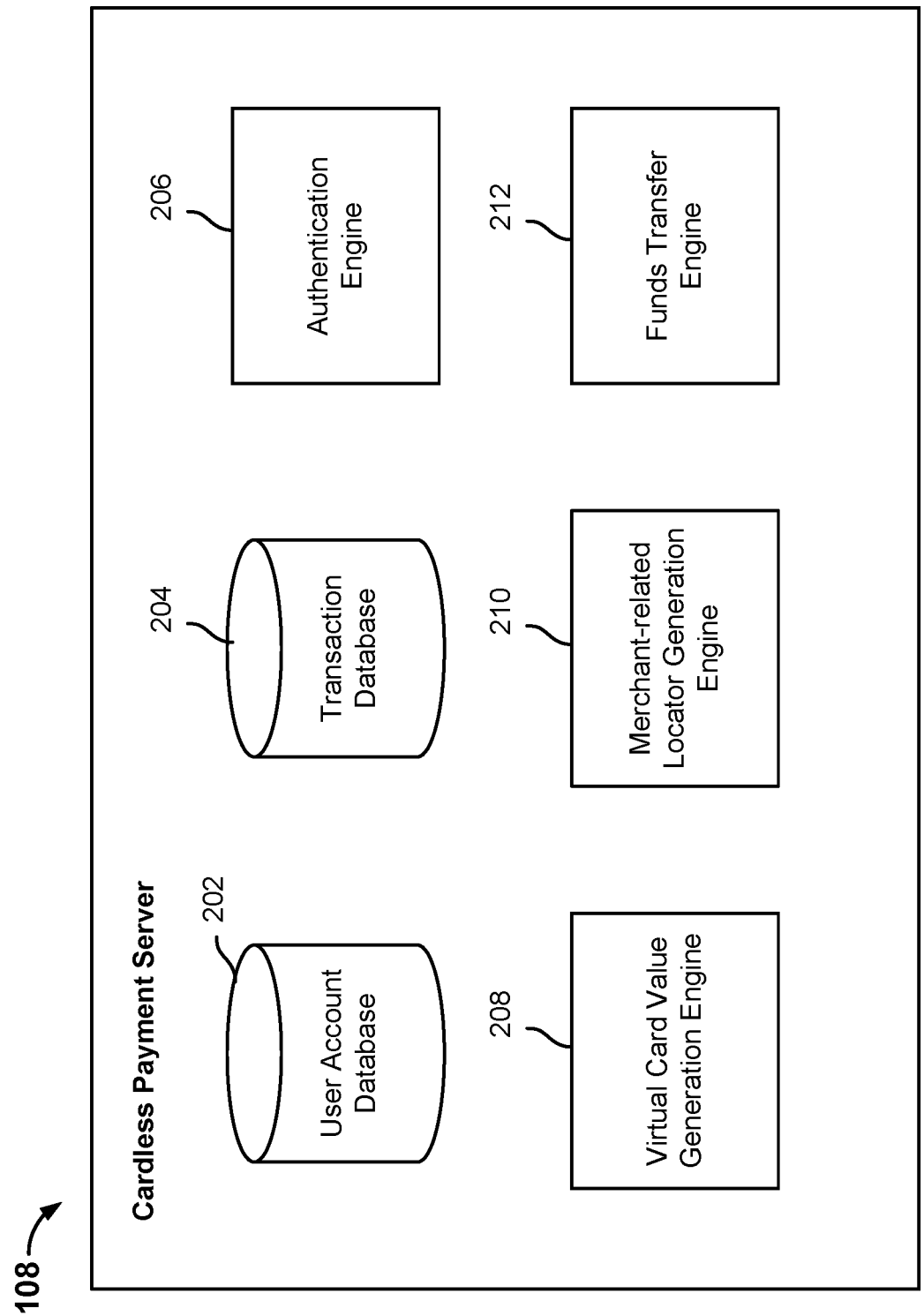
FIG. 2 is a diagram showing an example of a cardless payment server.

FIG. 2 is a diagram showing an example of a cardless payment server. In some embodiments, cardless payment server 108 of system 100 of FIG. 1 can be implemented using the example of FIG. 2. Each of user account database 202 and transaction database 204 can be implemented using one or more databases. Each of authentication engine 206, virtual card value generation engine 208, merchant-related locator generation engine 210, and funds transfer engine 212 can be implemented using one or both of software and/or hardware.

User account database 202 is configured to store information associated with user accounts created with the online payment platform with which the cardless payment server is associated. For example, information associated with a user account may include a user identifier, user credentials (e.g., login name and password), a (e.g., unique) virtual card value corresponding to each transaction made by the user, how much funds (if any) have been deposited into the user's online payment platform account, which one or more (e.g., external) sources of funds (e.g., bank account numbers) have been stored for the user, and data associated with corresponding entries in transaction database 204.

Transaction database 204 is configured to store information associated with various transactions performed using virtual card values for corresponding user accounts for which information is stored in user account database 202. For example, information associated with a transaction may include a transaction identifier (e.g., a unique identifier that is maintained internal to the cardless payment server), the virtual card value, the transaction amount, the user identifier associated with the user account involved in the transaction, and a status of the transaction (e.g., pending, completed, refunded, etc.).

Authentication engine 206 is configured to authenticate users who request to perform a transaction with a merchant using their respective online payment platform accounts. For example, in response to a user request to make a payment to a merchant server, the merchant server will redirect the user's web browser to a web page operated by the cardless payment server that prompts the user to submit his or her user credentials via one or more input fields. Authentication engine 206 will compare the submitted user credentials to sets of user credentials stored at user account database 202 to determine if there is a match. If a match is found, authentication engine 206 will send data to the web browser that indicates the success of the authentication and in some embodiments, authentication engine 206 also sends data that prompts the user to select a particular source of funds to use in the present transaction. If the user is successfully authenticated, in some embodiments, authentication engine 206 sends a message to virtual card value generation engine 208 to indicate that a virtual card value should be generated for the transaction associated with the authenticated user and optionally, information associated with the card management service that has been integrated with the merchant. Otherwise, if a match is not found, authentication engine 206 will send data to the web browser that indicates the failure of the authentication and in some embodiments, authentication engine 206 also prompts the user to resubmit credential information.

Virtual card value generation engine 208 is configured to generate a virtual card value corresponding to each transaction. In some embodiments, a unique virtual card value is generated for each transaction. In various embodiments, a virtual card value comprises a series of alphanumeric characters. In some embodiments, a virtual card value comprises the concatenation of three values, where each value may comprise one or more alphanumeric characters. For example, the first value can be determined based on information associated with the user account associated with the transaction, the second value can be determined based on information associated with an issuer of the virtual card value (e.g., a unique identification code associated with the merchant, the online payment platform, and/or the cardless payment server), and the third value can be selected to be a character sequence such that the concatenation of the first value, the second value, and the third value results in a unique value. In some embodiments, virtual card value generation engine 208 is configured to send the virtual card value corresponding to the transaction to be stored at corresponding entries of user account database 202 and/or transaction database 204.

Merchant-related locator generation engine 210 is configured to generate data to send to a web browser executing at a client device and is configured to cause the web browser to pass along the virtual card value and the transaction amount corresponding to the transaction to the merchant server. In various embodiments, a "merchant-related locator" comprises data usable to cause a web browser to pass along the virtual card value and the transaction amount corresponding to the transaction to the merchant server. For example, the merchant-related locator comprises a (e.g., HTTP) request that includes a redirection status code (e.g., 302) and a uniform resource locator (URL) that includes information associated with the merchant and/or the virtual card value. In some embodiments, the merchant-related locator is further configured to cause the merchant server to send pre-authorization information corresponding to the transaction to the card management server. In some embodiments, a merchant-related locator is generated in response to a card management server's confirmation that the virtual card value and the transaction amount corresponding to the transaction have been successfully stored.

Funds transfer engine 212 is configured to receive and process a request from the card management server to transfer the transaction amount corresponding to a virtual card value, which represents a transaction, from a source of funds associated with the user account involved in the transaction to a funds account associated with the merchant involved in the transaction. In some embodiments, funds transfer engine 212 is configured to use the virtual card value included in the request to look up an entry stored at transaction database 204 with a matching virtual card value and use the looked up information (e.g., in addition to information stored at user account database 202) to locate the appropriate source of funds (e.g., as designated by the user) for the transaction and request for (e.g., one or more financial institutions associated with the funds accounts or the online payment system to perform) the transfer of the transaction amount from the located source to the funds account associated with the merchant.

Although the databases and engines are shown to be implemented within cardless payment server 108 in this example, in some embodiments, one or more databases and/or engines are implemented on other devices and are accessible by the cardless payment server.

Figure 3:
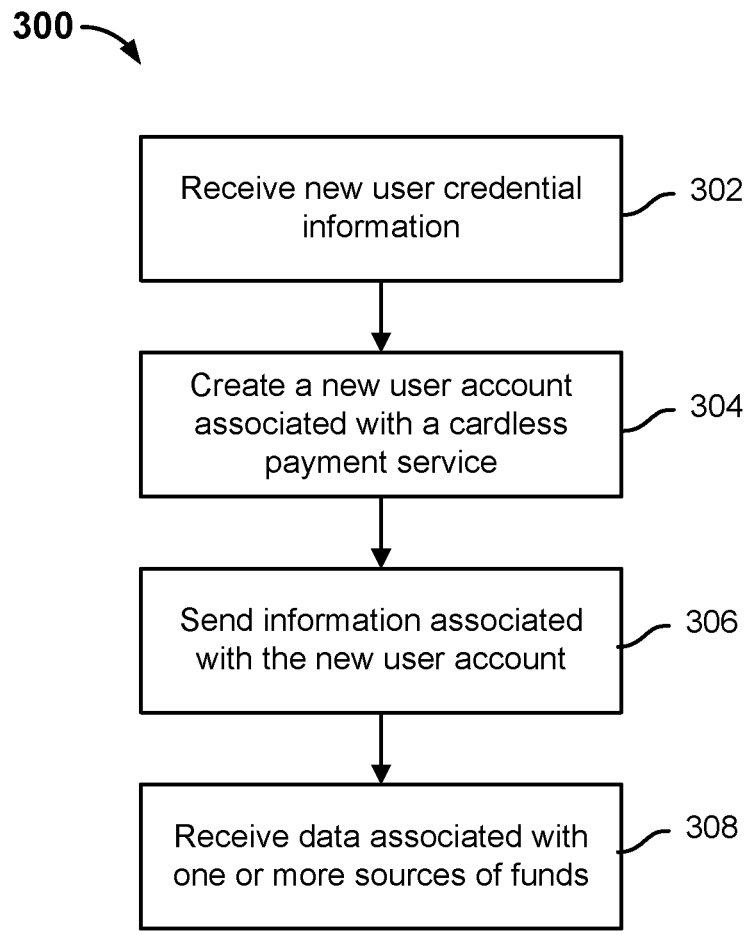
FIG. 3 is a flow diagram showing an embodiment of a process for creating a new user account at an online payment platform.

FIG. 3 is a flow diagram showing an embodiment of a process for creating a new user account at an online payment platform. In some embodiments, process 300 is implemented at cardless payment server 108 of system 100 of FIG. 1.

Process 300 describes an example of creating a new account with an online payment platform for a user.

At 302, new user credential information is received. For example, a user may create a new user account with the online payment platform by using a web browser to access a page associated with the online payment platform and selecting a control displayed on the page associated with creating a new user account. In response to the user selection, another page with input fields (e.g., within a form) that solicit for information associated with the user is sent to the user. Among the information that the user submits over the form are a user specified login name and a user specified password. In some embodiments, user credentials associated with an online payment platform account comprise a login name and a password.

At 304, a new user account associated with a cardless payment service is created. A new user account is created based at least in part on storing the user submitted credential information in addition to other user submitted information (e.g., name, birthday, address, etc.).

At 306, information associated with the new user account is sent. In some embodiments, the information includes a user identifier assigned to the new user account. The user identifier associated with the new user account can be sent to the web browser used by the user.

At 308, data associated with one or more sources of funds is received. In some embodiments, the user can optionally submit data that identifies one or more sources of funds from which funds can be drawn to complete future transactions. An example source of funds is a bank account. In some embodiments, the user can also select to transfer a specified amount from at least one of the identified sources of funds into the online payment platform account (e.g., by making a deposit of a specified amount of money) such that during a future transaction, funds can be directly transferred out of the user's online payment platform account instead of being located from an external source.

Figure 4:
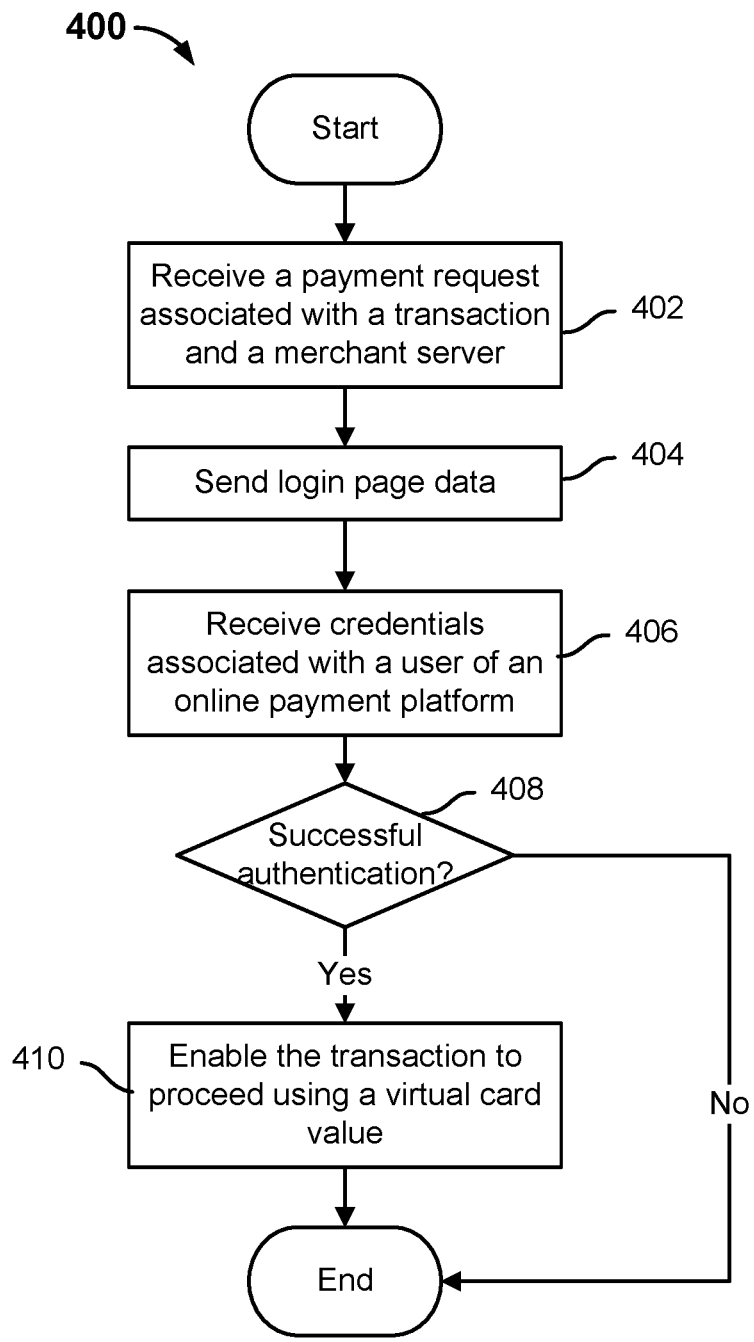
FIG. 4 is a flow diagram showing an embodiment of a process of authenticating a user of an online payment platform.

FIG. 4 is a flow diagram showing an embodiment of a process of authenticating a user of an online payment platform. In some embodiments, process 400 is implemented at cardless payment server 108 of system 100 of FIG. 1.

Process 400 describes an example of authenticating a user with an online payment platform account prior to permitting a transaction to be performed for the user using a virtual card value.

At 402, a request associated with a transaction and a merchant server is received. For example, the request is sent from a web browser executing at the user's client device. The request includes information associated with the transaction that the user desires to complete with the merchant server (e.g., for a purchase of a product sold at a website operated by the merchant server). Information associated with the transaction may include, for example, a transaction amount (e.g., the total cost of the desired purchase) and identifying information associated with the relevant merchant.

At 404, login page data is sent. Data associated with a login page (e.g., the URL of the login page and/or data that can be rendered by a web browser to display a login page) for the online payment platform is sent to the user's web browser.

At 406, credentials associated with a user of an online payment platform are received. The login page prompts for the user to submit the user's credentials with the online payment platform.

At 408, it is determined whether the authentication is successful. In the event that the authentication is successful, control is transferred to 410. Otherwise, in the event that the authentication is not successful, process 400 ends. For example, the received user credentials are compared to sets of stored user credentials to determine if there is a match. If a match is found, then the authentication is successful and in some embodiments, the user is prompted to select a particular source of funds to use in the present transaction. Otherwise, if no match is found, then the authentication is not successful and process 400 ends.

At 410, the transaction is permitted to proceed using a virtual card value. Because the user has been successfully authenticated with the online payment platform, a virtual card value is permitted to be generated corresponding to the transaction and to be used to complete the transaction.

Figure 5:
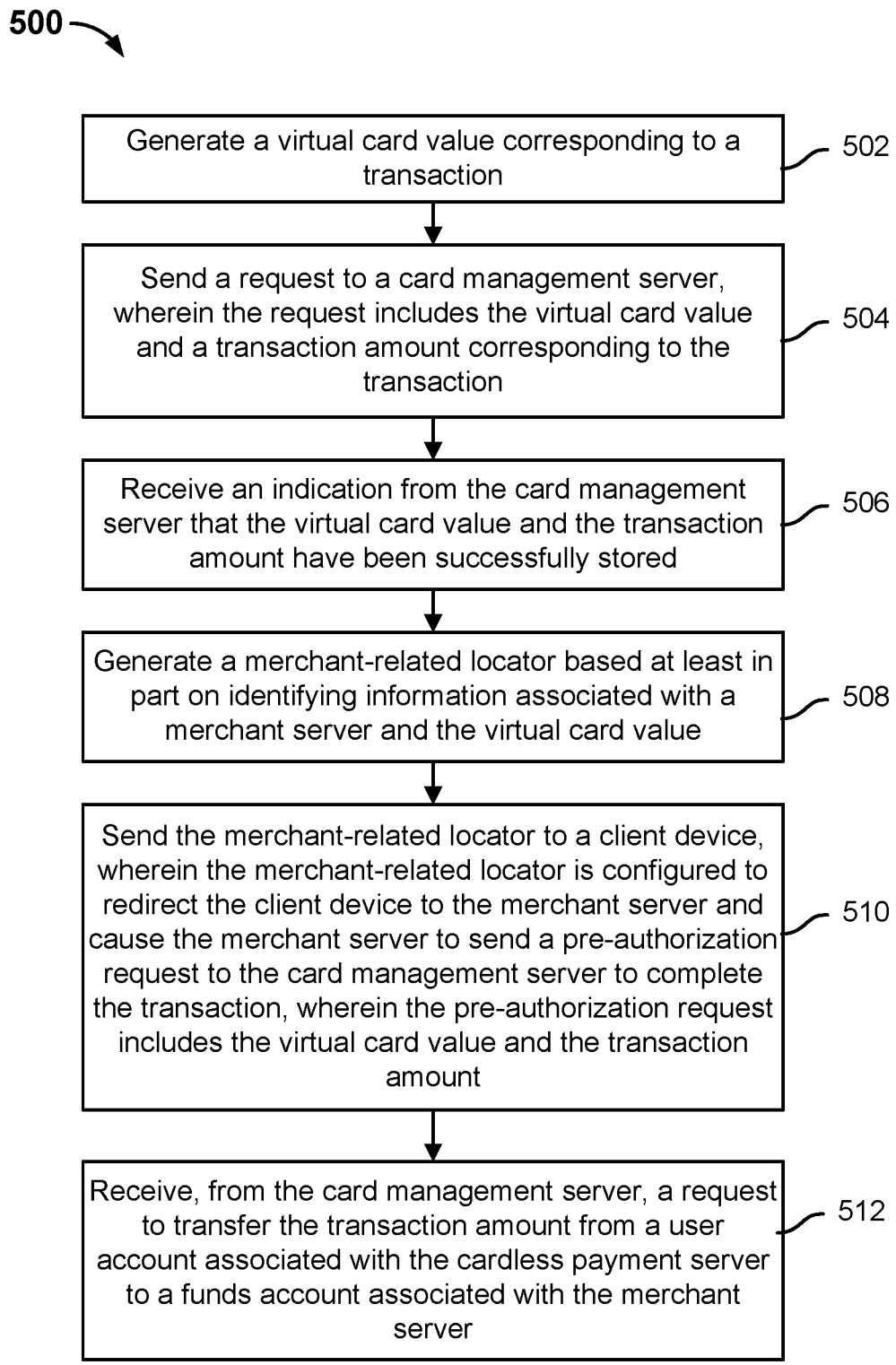
FIG. 5 is a flow diagram showing an embodiment of a process for performing a transaction using a virtual card value.

FIG. 5 is a flow diagram showing an embodiment of a process for performing a transaction using a virtual card value. In some embodiments, process 500 is implemented at cardless payment server 108 of system 100 of FIG. 1.

At 502, a virtual card value corresponding to a transaction is generated. In various embodiments, a virtual card value is generated for each transaction. For example, the transaction may be initiated by a user making a selection to pay for one or more items sold by a merchant at a website or a physical store with web site access. In some embodiments, a unique virtual card value is generated for each transaction. In some embodiments, the virtual card value is generated based at least in part on information associated with the user involved in the transaction, information associated with the merchant involved in the transaction, and/or information associated with the online payment platform associated with the cardless payment server. In some embodiments, the cardless payment server stores the virtual card value with other information associated with the transaction (e.g., a transaction identifier, the transaction amount, and a user identifier).

At 504, a request is sent from a cardless payment server to a card management server, wherein the request includes the virtual card value and a transaction amount corresponding to the transaction and the request is configured to cause the card management server to store the virtual card value and the transaction amount. A request that includes the generated virtual card value and the transaction amount are sent to the card management server. In some embodiments, the request to the card management server is sent as a web service call that includes a XML file. In some embodiments, the request to the card management server is sent as a HTTP request that includes a basic access authentication. The basic access authentication may include a user name and a password of the cardless payment server and/or the online payment platform. For example, a basic access authentication is performed each time the cardless payment server sends this type of request to the card management server. In some embodiments, information associated with the user involved in the transaction is not included in the request sent to the card management server so as to maintain the user's privacy.

At 506, an indication that the virtual card value and the transaction amount have been successfully stored is received from the card management server. In response to the request, the card management server stores information associated with the request including the virtual card value and the transaction amount corresponding to a new virtual card. For example, the limit of the virtual card is set to the transaction amount, the balance of the virtual card is set to zero, and an expiration date is set to a date that is a user configured number of days (e.g., 365) into the future (e.g., relative to the current time). After the card management server has successfully stored the information associated with the new virtual card, the card management server sends an indication back to the cardless payment server.

At 508, a merchant-related locator is generated based at least in part on identifying information associated with a merchant server and the virtual card value.

At 510, the merchant-related locator is sent to a client device, wherein the merchant-related locator is configured to redirect the client device to the merchant server and cause the merchant server to send a pre-authorization request to the card management server to complete the transaction, wherein the pre-authorization request includes the virtual card value and the transaction amount. In response to receipt of the indication, the cardless payment server generates a merchant-related locator (e.g., in HTTP request) to send to the web browser executing at a client device that is used by the user involved in the transaction. In various embodiments, the merchant-related locator comprises a HTTP request that includes a redirection instruction (e.g., HTTP status code 302) to a URL. The URL associated with the merchant-related locator is associated with a format that is specified by the merchant server. For example, the merchant-related locator includes information associated with the merchant and/or the virtual card value. An example of a URL included in a merchant-related locator generated for the merchant "Merchant" and for the virtual card value of "vcardvalue" comprises: https://www.merchant.com/PayResultNotification.do?vcardvalue. In some embodiments, the format of the merchant-related locator is specified by the merchant associated with the transaction. Different merchants may specify different formats for the merchant-related locator.

In some embodiments, the merchant-related locator is configured to cause the web browser executing at the client device that is used by the user to redirect to a page (corresponding to URL included in the merchant-related locator) associated with the merchant server (e.g., using a Location header that includes HTTP status code 302 for redirection) and to send to the merchant server a request that includes the virtual card value and the transaction amount. The merchant server will then send a pre-authorization request to the card management server, where the pre-authorization request includes a request for the card management server to authorize the transaction amount to be charged on the virtual card corresponding to the virtual card value. In response to receipt of the pre-authorization request, the card management server can grant the authorization and send back a pre-authorization confirmation to the merchant server, which then stores data indicating that the payment of the transaction amount corresponding to the transaction has been authorized. For example, the pre-authorization can be a first portion of a settlement technique (e.g., this settlement technique is sometimes referred as "authorize and capture") in which the authorization of payment is first granted and then the correct funds associated with the authorized payment are transferred to the merchant's funds account at a later time. After the merchant server stores data indicating the payment of the transaction amount corresponding to the transaction has been authorized, the merchant server can send page data indicating a transaction completion confirmation to the web browser.

In some embodiments, the HTTP request including the merchant-related locator includes a signature. The signature comprises encrypted data generated by the cardless payment server and/or the online payment platform using a key. The signature is also configured to be redirected by the web browser to the merchant server and the merchant server will decrypt the signature using a locally stored key to authenticate the merchant-related locator and verify that the locator came from an authorized source. For example, the signature comprises an application-level form of authentication.

At 512, a request to transfer the transaction amount from a user account associated with the cardless payment server to a funds account associated with the merchant server is received from the card management server. In some embodiments, a capture request (e.g., the second portion of the "authorize and capture" settlement technique) corresponding to the virtual card value of the transaction can be sent from the merchant server to the card management server, which subsequently sends the request to transfer the transaction amount to the cardless payment server. In some embodiments, in response to receipt of the request, the cardless payment server locates a source of funds previously selected by the user involved in the transaction to use for the transaction. The cardless payment server can initiate the transfer of the transaction amount from the identified source of user funds to a funds account associated with the merchant, for example, by issuing a request to the financial institution (e.g., bank) associated with the identified source of user funds or to the online payment platform associated with the user funds.

Figure 6:
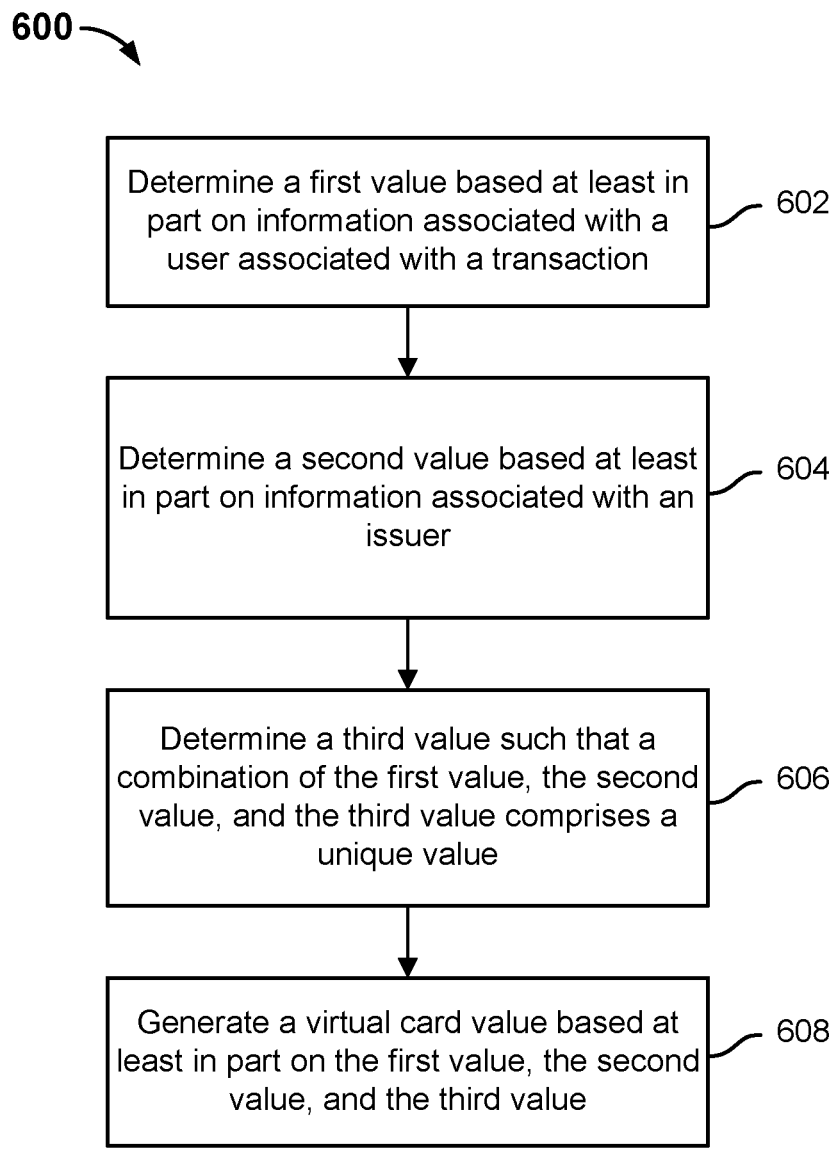
FIG. 6 is a flow diagram showing an embodiment of a process for generating the virtual card value corresponding to a transaction.

FIG. 6 is a flow diagram showing an embodiment of a process for generating the virtual card value corresponding to a transaction. In some embodiments, process 600 is implemented at cardless payment server 108 of system 100 of FIG. 1. In some embodiments, 502 of process 500 of FIG. 5 can be implemented using process 600.

At 602, a first value is determined based at least in part on information associated with a user associated with a transaction. A first value (e.g., comprising one or more alphanumeric characters) can be generated using at least some of the information stored for the user account involved in the transaction. For example, at least some of the information stored for the user account (e.g., the user identifier string) can be hashed using a configured hash technique and the resulting hash can serve as the first value.

At 604, a second value is determined based at least in part on information associated with an issuer. A second value (e.g., comprising one or more alphanumeric characters) can be generated using at least some of the information stored for an issuer associated with the transaction. For example, the issuer associated with the transaction may refer to one or both of the online payment platform associated with the cardless payment server and the merchant associated with the transaction. For example, at least some of the information stored for the issuer (e.g., an identifier string associated with the issuer) can be hashed using a configured hash technique and the resulting hash can serve as the second value.

At 606, a third value is determined such that a combination of the first value, the second value, and the third value comprises a unique value. In various embodiments, a unique virtual card value is to be generated for each transaction. Because a user can perform multiple transactions and at least some of the transactions can involve the same issuer, the combination (e.g., concatenation) of the first value and the second value may not result in a unique value. As such, in some embodiments, a third value, comprising a sequence of alphanumeric characters, can be generated such that the combination (e.g., concatenation) of the first value, the second value, and the third value comprises a unique value. For example, the third value can be generated as a random sequence of characters and then concatenated to the first and second values to verify that the combined value is unique (e.g., relative to previously generated virtual card values).

At 608, a virtual card value is generated based at least in part on the first value, the second value, and the third value. In some embodiments, the virtual card value is generated as a concatenation of the first value, the second value, and the third value. In some embodiments, the virtual card value may be generated to include a delimiter character (e.g., "-") in between the first and second values and another delimiter character in between the second and third values.

Figure 7:
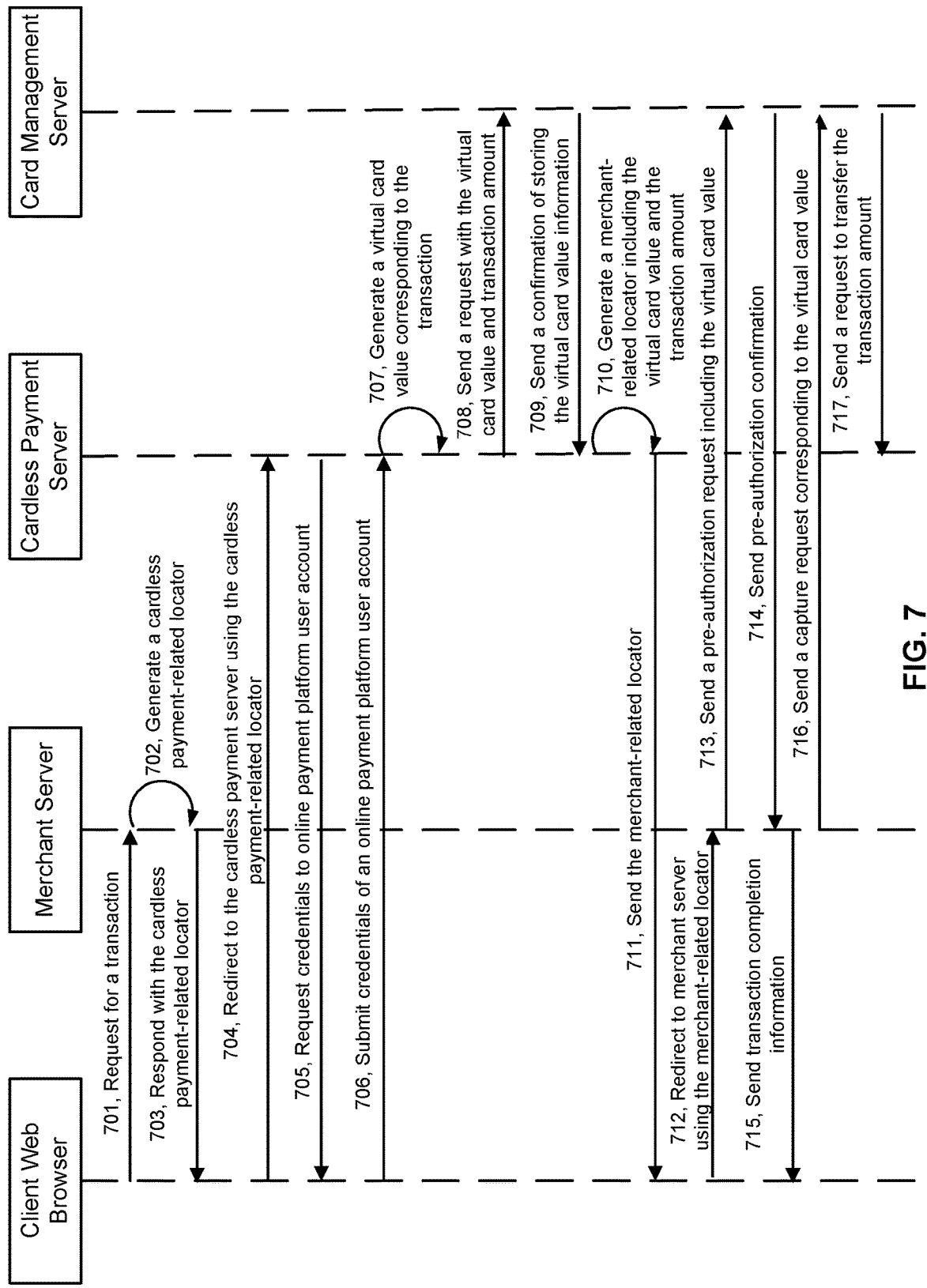
FIG. 7 is a sequence diagram showing an example in which a transaction is performed using a virtual card value.

FIG. 7 is a sequence diagram showing an example in which a transaction is performed using a virtual card value. In some embodiments, the client web browser of FIG. 7 can be implemented by a web browser executing at client device 102 of system 100 of FIG. 1. In some embodiments, the merchant server of FIG. 7 can be implemented by merchant server 106 of system 100 of FIG. 1. In some embodiments, the cardless payment server of FIG. 7 can be implemented by cardless payment server 108 of system 100 of FIG. 1. In some embodiments, the card management server of FIG. 7 can be implemented by card management server 110 of system 100 of FIG. 1.

At 701, the client web browser sends a request to perform a transaction to the merchant server. For example, the transaction includes a user initiated purchase of one or more items sold by a merchant associated with the merchant server over a website. During the checkout process, the website prompted the user to select a payment method and in response, the user selected the payment method of using his or her account with an online payment platform (e.g., Alipay®), which is associated with the cardless payment server. For example, the request for the transaction includes the transaction amount (e.g., the total price of the items that the user desires to purchase, including shipping and handling and tax). For example, the request for the transaction can be implemented as a HTTP request. In response to receipt of the request for the transaction, at 702, the merchant server generates a cardless payment-related locator. In some embodiments, the cardless payment-related locator comprises a (e.g., HTTP) request including a URL. For example, the cardless payment-related locator includes parameter values that are specific to the present transaction. An example of the URL included in the cardless payment-related locator is https://www.alipay.com/cooperate/gateway.do?total_fee=13&currency=USD&notify_url=http%3A%2F%2Fwww.tabao.com&service=create_forex_trade&agent=2088002007018916&partner=2088002007-018916&out_trade_no=16177126201&subject=4256001-3718&return_url=http%3A%2F%2Fwww.tabao.com&body=71819701647&sign=UzZ7bRelBtSVB63jsfI9vbu3-d21442SJV 88po0XvlptqWGM4rxP5EQ%3D%3D&sign_type=DSA. The cardless payment-related locator can be generated based on a format specified by the online payment platform and/or the cardless payment server. For example, the cardless payment-related locator may include the transaction amount. An HTTP response including the cardless payment-related locator and a Location header that includes HTTP status code 302 for redirection is sent by the merchant server to the client web browser at 703.

At 704, the client web browser can be redirected to the cardless payment server using the cardless payment-related locator from the merchant server. At 705, in response to the request from the client web browser, the cardless payment server sends data associated with a page that prompts for user credentials associated with an account at the online payment platform. The client web browser can display the page that prompts for user credentials and at 706, the user can submit his or her user credentials via the page to the cardless payment server. If the submitted user credentials can be authenticated, then in some embodiments, the cardless payment server can send data associated with a page that prompts for the user to select a desired source of funds to apply to the transaction (not shown).

If the submitted user credentials can be authenticated, at 707, the cardless payment server generates a virtual card value corresponding to the transaction. For example, the cardless payment server can generate a virtual card value corresponding to the transaction using a process such as process 600 of FIG. 6. In some embodiments, the cardless payment server stores information associated with the transaction, including the virtual card value and a (e.g., locally) generated transaction identifier. At 708, the cardless payment server sends a request including the virtual card value and the transaction amount to the card management server. In some embodiments, the request sent at 708 includes HTTP basic authentication credentials. In some embodiments, the request sent at 708 includes a web service call. In response to receipt of the request from the cardless payment server, the card management server stores the virtual card value and the transaction amount (e.g., among other information such as a balance and an expiration date) as information associated with a new virtual card. After storing such information, at 709, the card management server sends a confirmation to the cardless payment server confirming that the virtual card value and the transaction amount have been successfully stored. In response to receipt of the confirmation, at 710, the cardless payment server generates a merchant-related locator that includes the virtual card value and the transaction amount and at 711, sends the merchant-related locator (e.g., a HTTP request) to the client web browser. At 712, the client web browser can be redirected to the merchant server using the merchant-related locator. The virtual card value and the transaction amount included in the merchant-related locator are then passed to the merchant server. In some embodiments, the request associated with the merchant-related locator also includes an encrypted signature that was generated by the cardless payment server and the merchant server can authenticate the source of the locator by decrypting the signature using a locally stored key. At 713, the merchant server sends a pre-authorization request including the virtual card value to the card management server. The pre-authorization request may also include the transaction amount. For example, the pre-authorization is the first portion of the "authorize and capture" payment settlement solution. The card management server can grant the authorization of a payment via the virtual card value included in the pre-authorization request, where the payment is of the transaction amount. For example, the card management server can store data with the relevant virtual card value that a charge of the transaction amount (e.g., the limit on the virtual card) has been authorized. Then, at 714, the card management server can send a pre-authorization confirmation to the merchant server to inform the merchant server that the payment has been authorized. In response to receipt of the pre-authorization confirmation, the merchant server can store data indicating the transaction has been authorized and send at 715, transaction completion information to the client web browser. For example, the transaction completion information may include a transaction confirmation number that was generated by the merchant server. For example, the client web browser can present the transaction completion to the user to inform him or her that the transaction has been successfully completed. In some embodiments, at this point, the merchant server can prepare to deliver the items purchased by the user. The user who had selected to pay for the transaction using his or her online payment platform may not know of the virtual card value generated for the transaction and/or the involvement of the card management server.

At 716, the merchant server can send a capture request corresponding to the virtual card value to the card management server. In some embodiments, the capture request may comprise a batch file that request captures corresponding to multiple transactions. In response to receipt of the capture request, at 717, the card management server verifies that the capture corresponds to a virtual card value for which the limit (e.g., the transaction amount) has been authorized as a payment and then sends a request to transfer the transaction amount associated with the virtual card value included in the capture request to the cardless payment server. The cardless payment server can initiate the transfer of funds from a source of funds selected by the user for the transaction to a funds account associated with the merchant server.

Figure 8:
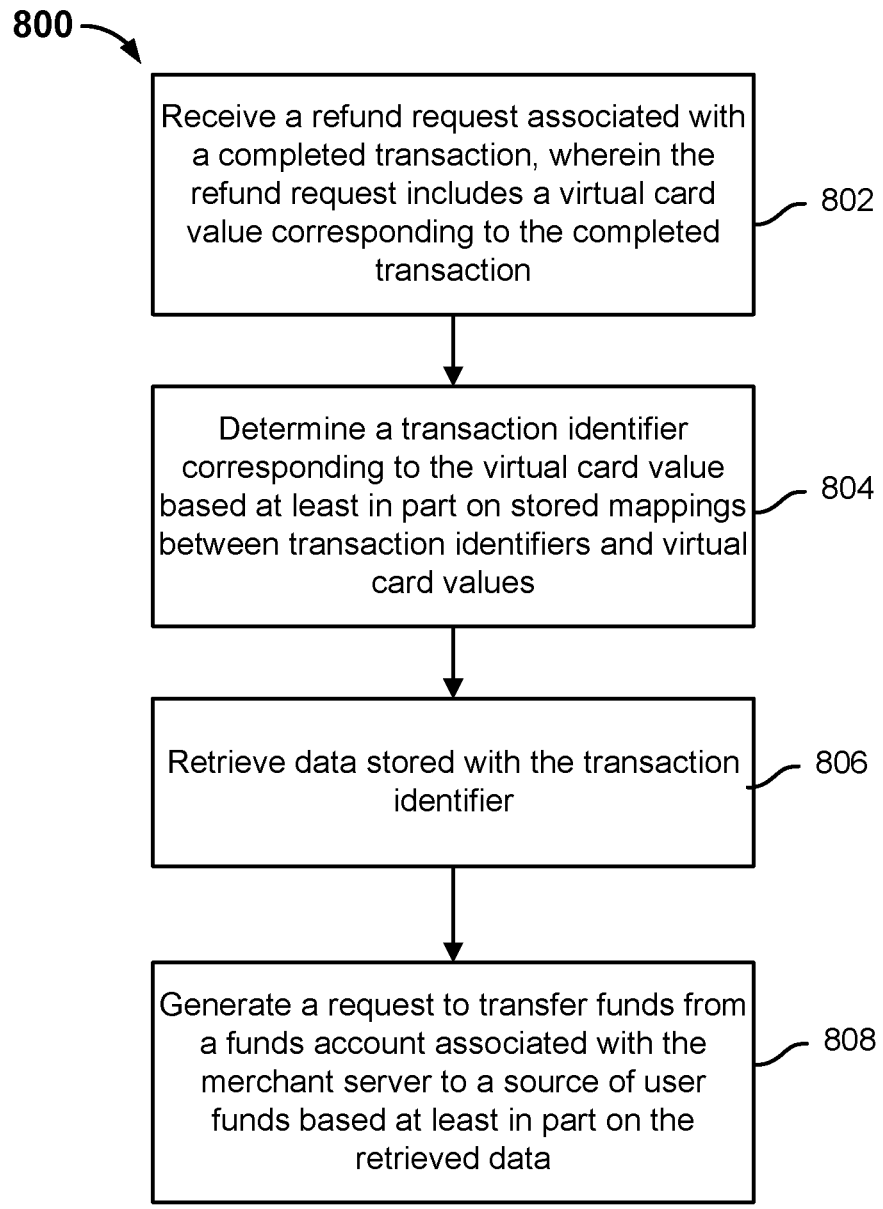
FIG. 8 is a flow diagram showing an embodiment of a process for performing a refund associated with a transaction that was completed using a virtual card value.

Embodiments of the system described herein handle refunds as well as payments. FIG. 8 is a flow diagram showing an embodiment of a process for performing a refund associated with a transaction that was completed using a virtual card value. In some embodiments, process 800 is implemented at cardless payment server 108 of system 100 of FIG. 1.

Process 800 describes an example of performing a refund for a transaction that was completed with a virtual card value. Prior to process 800, the transaction amount associated with the transaction had been transferred from a source of funds associated with the user that was involved in the transaction to a funds account associated with the merchant that was involved in the transaction.

At 802, a refund request associated with a completed transaction is received from a merchant server, wherein the refund request includes a virtual card value corresponding to the completed transaction. For example, a user may initiate a refund of a previously completed transaction at the website associated with the merchant server involved in that transaction. For example, the user may provide the merchant server with the transaction confirmation number associated with the transaction. The merchant server can determine a virtual card value corresponding to that transaction confirmation number previously generated and stored by the merchant server based on stored mappings between virtual card values and transaction confirmation numbers. The merchant server can then send the determined virtual card value to the cardless payment server. In some other embodiments, the merchant server can send the determined virtual card value to the card management server for the card management server to complete the refund process.

At 804, a transaction identifier corresponding to the virtual card value is determined based at least in part on stored mappings between transaction identifiers and virtual card values. A transaction identifier previously generated and stored by the cardless payment server can be determined based on locally stored mappings between virtual card values and transaction identifiers.

At 806, data stored with the transaction identifier is retrieved. Data that is stored with the determined transaction identifier at the cardless payment server can be retrieved. In some embodiments, the retrieved data stored with the determined transaction identifier includes a user identifier, a source of funds associated with the user identifier, a merchant identifier, and/or a transaction amount.

At 808, a request to transfer funds from a funds account associated with the merchant server to a source of user funds is generated based at least in part on the retrieved data. A request to transfer the transaction amount from a funds account associated with the merchant identifier to the source of funds associated with the user identifier is generated, for example. In some embodiments, the request can be sent to the merchant server and/or a financial institution associated with the funds account associated with the merchant identifier.

Figure 9:
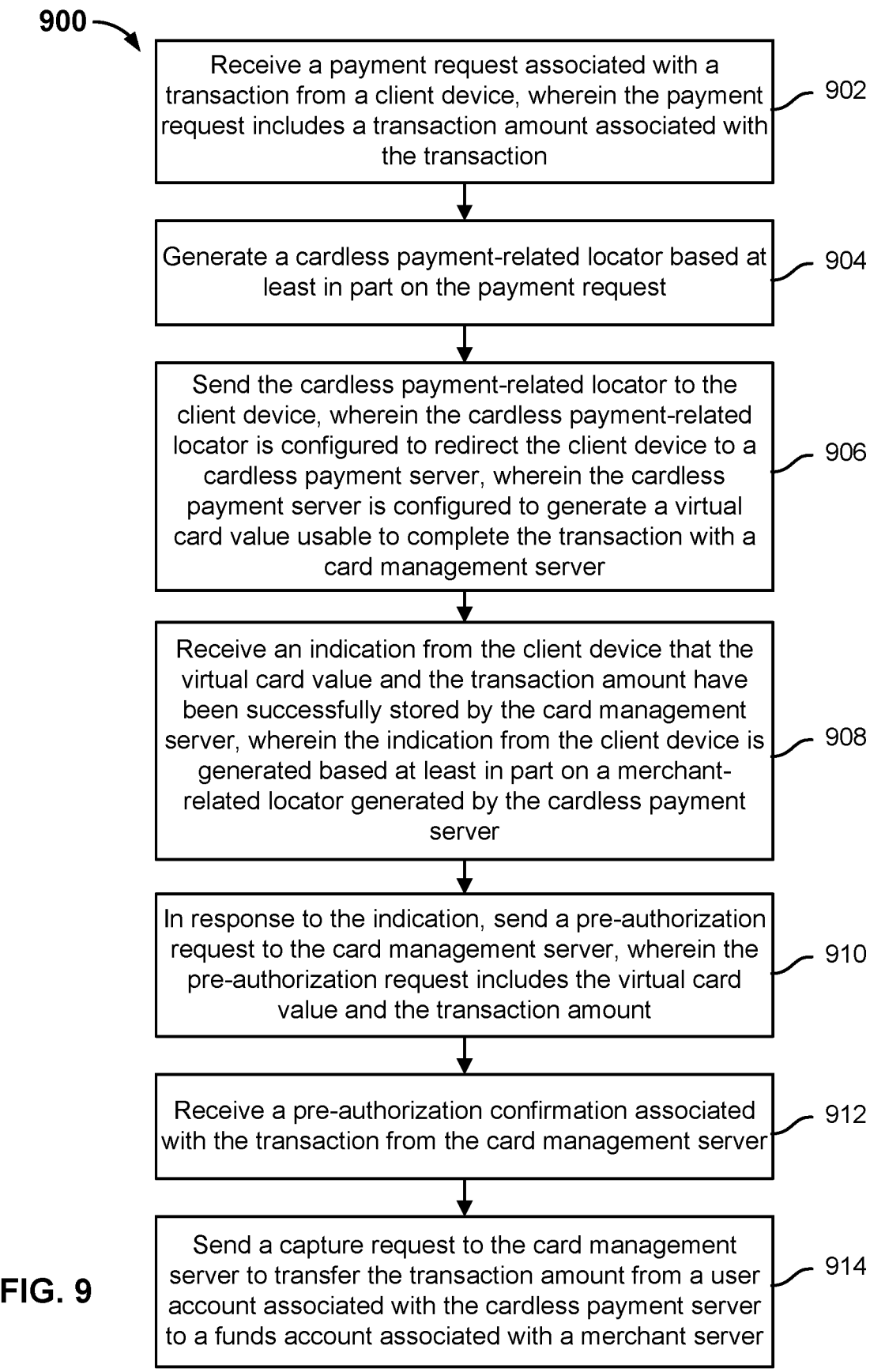
FIG. 9 is a flow diagram showing an embodiment of a process of performing a transaction using a virtual card value.

FIG. 9 is a flow diagram showing an embodiment of a process of performing a transaction using a virtual card value. In some embodiments, process 900 is implemented at merchant server 106 of system 100 of FIG. 1.

Process 900 describes an example of performing a transaction using a virtual card value from the perspective of the merchant server.

At 902, a payment request associated with a transaction is received from a client device, wherein the payment request includes a transaction amount associated with the transaction. For example, a user has made a selection to purchase one or more items sold at a website associated with the merchant server and selected to use his or her online payment platform account to pay for the purchase. For example, the payment request includes an HTTP request. A cardless payment server associated with the online payment platform is configured to facilitate the payment between the user's online payment platform account and a funds account associated with the merchant.

At 904, a cardless payment-related locator is generated based at least in part on the payment request. In various embodiments, a cardless payment-related locator comprises a HTTP request and a URL. In some embodiments, the cardless payment-related locator is generated based on a format (e.g., parameter types) specified by the cardless payment server and/or the online payment platform. For example, the cardless payment-related locator includes parameter values that are specific to the present transaction.

At 906, the cardless payment-related locator is sent to the client device, wherein the cardless payment-related locator is configured to redirect the client device to a cardless payment server, wherein the cardless payment server is configured to generate a virtual card value usable to complete the transaction with a card management server. In various embodiments, the cardless payment-related locator is sent to the, e.g., web browser, of the client device as an HTTP request. The HTTP request can be configured to redirect (e.g., by using a Location header that includes HTTP status code 302 for redirection) the client device to the cardless payment server. The cardless payment server can then send data associated with a page that prompts the users to submit his or her user credentials associated with his or her online payment platform account.

At 908, an indication that the virtual card value and the transaction amount have been successfully stored by the card management server is received, wherein the indication from the client device is generated based at least in part on a merchant-related locator generated by the cardless payment server. In the event that the user's submitted credentials can be authenticated, the cardless payment server can generate a virtual card value corresponding to the transaction and send the virtual card value and the transaction amount to the card management server. Then, a response associated with successful storage of the virtual card value and the transaction amount is sent back to the cardless payment server. The cardless payment server generates a merchant-related locator that includes the virtual card value and the transaction amount and sends it in an HTTP request to the client device. The indication including the virtual card value and the transaction amount are passed to the merchant server via the client device being redirected by the merchant-related locator to the merchant server.

At 910, in response to the indication, a pre-authorization request is sent to the card management server, wherein the pre-authorization request includes the virtual card value and the transaction amount. Based on the virtual card value and the transaction amount included in the indication, the merchant server sends a pre-authorization request including the virtual card value and the transaction amount to the card management server.

At 912, a pre-authorization confirmation associated with the transaction is received from the card management server. For example, the card management server can determine to authorize a payment of the transaction amount corresponding to the transaction associated with the virtual card value. In response to receiving the pre-authorization confirmation associated with the transaction, the merchant server can store data indicating that payment for the transaction has been successfully authorized. In the event the pre-authorization is granted by the card management server, the merchant server can send transaction completion information to be presented to the user by the web browser executing at the client device.

At 914, a capture request to transfer the transaction amount from a user account associated with the cardless payment server to a funds account associated with a merchant server is sent to the card management server. Sometime after the pre-authorization is granted by the card management server, the merchant server can send to the card management server a capture request to transfer the transaction amount from a user account associated with the cardless payment server to a funds account associated with a merchant (server). In some embodiments, the capture request includes the virtual card value. In some embodiments, the capture request is sent in a batch, along with several other capture requests corresponding to other transactions. The card management server can then communicate with the cardless payment server to complete the transfer of funds.

For example, a capture request is included in a capture file that includes both a capture request and a refund request. For example, the capture file includes five sections: the file header (e.g., the first line of the file, contains the file level information such as who provided the file, the file version, etc.), the capture header (e.g., the second line of the file, contains the summary information for a capture request), a capture item (e.g., that represents the capture request), a refund header (e.g., includes the summary information for the refund request), and a refund item (e.g., that represents a refund request). The file header section may include, specifically, for example, the following parameters: record_type (e.g., the type of request that is being submitted), sumbit_party, recipient_party, submit_dt (e.g., the submission date and time), form_version (e.g., the version of the file), and file_name. The capture header section may include, specifically, for example, the following parameters: record_type (e.g., identifies the capture header section), total nums (e.g., the total number of capture items), and transaction_DT (e.g., the transaction date). The capture item section may include, specifically, for example, the following parameters: record_type, alipay_trans_ID (e.g., the user's Alipay identifier), partner_trans_ID, amount (e.g., the capture amount), and currency (e.g., the currency in which the transaction is paid). The refund header section may include, specifically, for example, the following parameters: record_type (e.g., identifies the refund header section) and total_nums (e.g., the total number of items to refund). The refund item section may include, specifically, for example, the following parameters: record_type (e.g., identifies the refund item section), partner_trans_ID, alipay_trans_ID, partner_refund_ID, amount (e.g., of the refund), currency (e.g., the currency in which refund is to be made), and reason (e.g., a user state reason for the refund).

Figure 10:
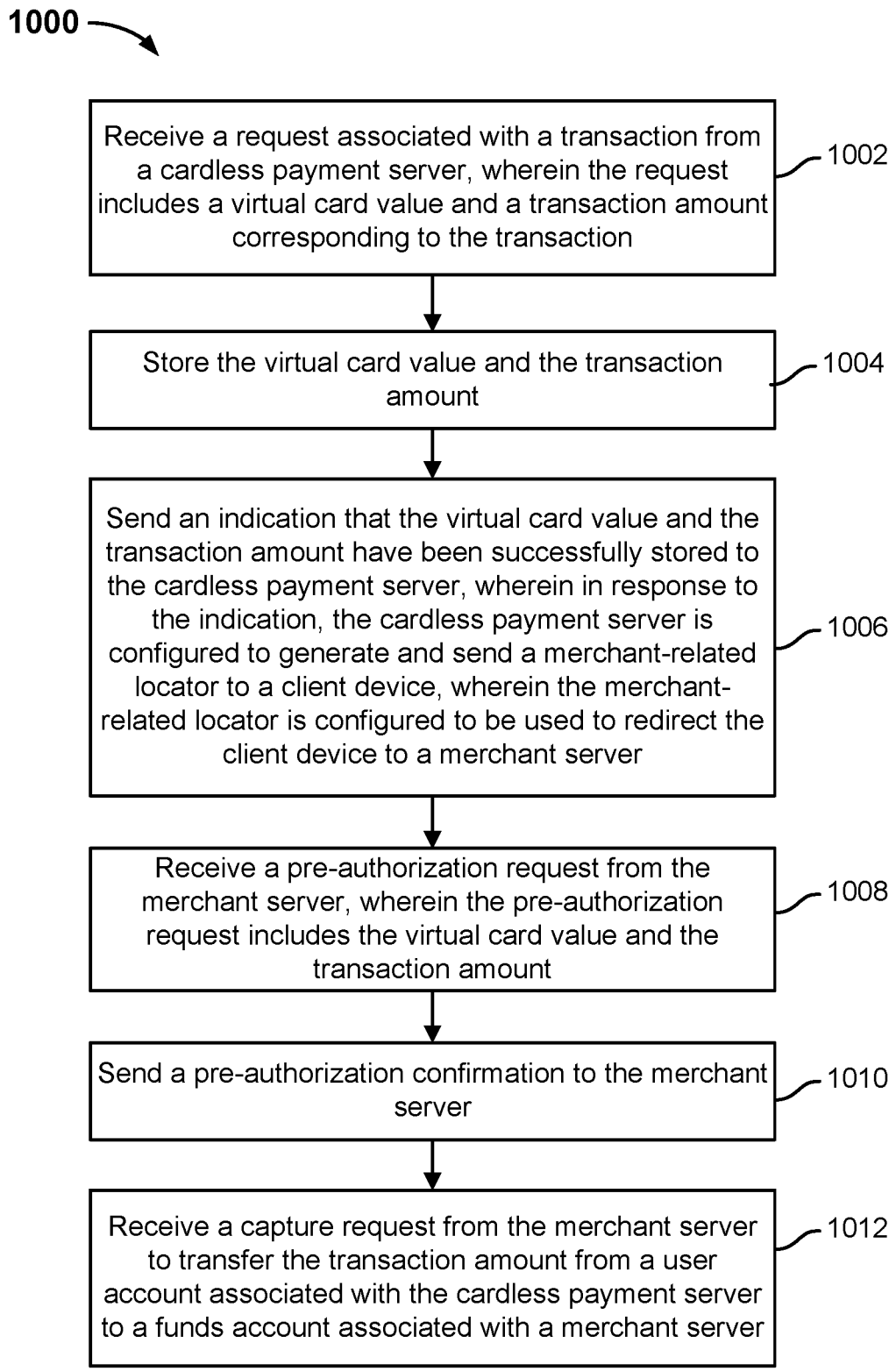
FIG. 10 is a flow diagram showing an embodiment of a process of performing a transaction using a virtual card value.

FIG. 10 is a flow diagram showing an embodiment of a process of performing a transaction using a virtual card value. In some embodiments, process 1000 is implemented at card management server 110 of system 100 of FIG. 1.

Process 1000 describes an example of performing a transaction using a virtual card value from the perspective of the card management server.

At 1002, a request associated with a transaction is received from a cardless payment server, wherein the request includes a virtual card value and a transaction amount corresponding to the transaction. For a payment requested to be made to a merchant for a transaction using a user's online payment platform account, the cardless payment server associated with the online payment platform generates a virtual card value corresponding to the transaction. The virtual card value and the transaction amount are sent to the card management server via a web service call (e.g., by sending an HTTP POST request with an XML document). In some embodiments, credentials associated with the cardless payment server for HTTP basic authentication may also be included in the request.

At 1004, the virtual card value and the transaction amount are stored. The virtual card value and the transaction amount are stored as information associated with a new virtual card at the card management server. For example, the limit for the new virtual card can be set to the transaction amount. In some embodiments, stored information associated with the new virtual card also includes a user configured expiration date (e.g., one year from the date the transaction was initiated) and a user configured balance. Instead of user-configured, the expiration date and balance may also be determined by the online payment platform or the card management server.

At 1006, an indication that the virtual card value and the transaction amount have been successfully stored is sent to the cardless payment server, wherein in response to the indication, the cardless payment server is configured to generate and send a merchant-related locator to a client device, wherein the merchant-related locator is configured to be used to redirect the client device to a merchant server. In response to the indication from the card management server, the cardless payment server generates the merchant-related locator to use to pass the virtual card value and the transaction amount to the merchant server via the client device.

At 1008, a pre-authorization request is received from the merchant server, wherein the pre-authorization request includes the virtual card value and the transaction amount. The pre-authorization request can be granted in some embodiments, if the virtual card value and the transaction amount can be matched to virtual card information stored by the card management server. The card management server can store data associated with the virtual card value indicating that a charge of the limit (e.g., the transaction amount) has been authorized on the virtual card.

At 1010, a pre-authorization confirmation is sent to the merchant server. If the pre-authorization is granted by the card management server, confirmation of the authorization is sent to the merchant server.

At 1012, a capture request is received from the merchant server to transfer the transaction amount from a user account associated with the cardless payment server to a funds account associated with the merchant server. Sometime after the pre-authorization is granted by the card management server, the merchant server can send to the card management server a capture request to transfer the transaction amount from a user account associated with the cardless payment server to a funds account associated with a merchant. In some embodiments, the capture request includes the virtual card value. In some embodiments, the capture request is sent in a batch, along with several other capture requests corresponding to other transactions. The card management server can verify that the virtual card value included in a capture request is associated with one for which payment has been authorized. The card management server can then communicate with the cardless payment server to complete the transfer of funds.

FIGS. 11 through 14 illustrate examples of applying various embodiments described above to enable a user to make a purchase using a virtual card value.

Figure 11:
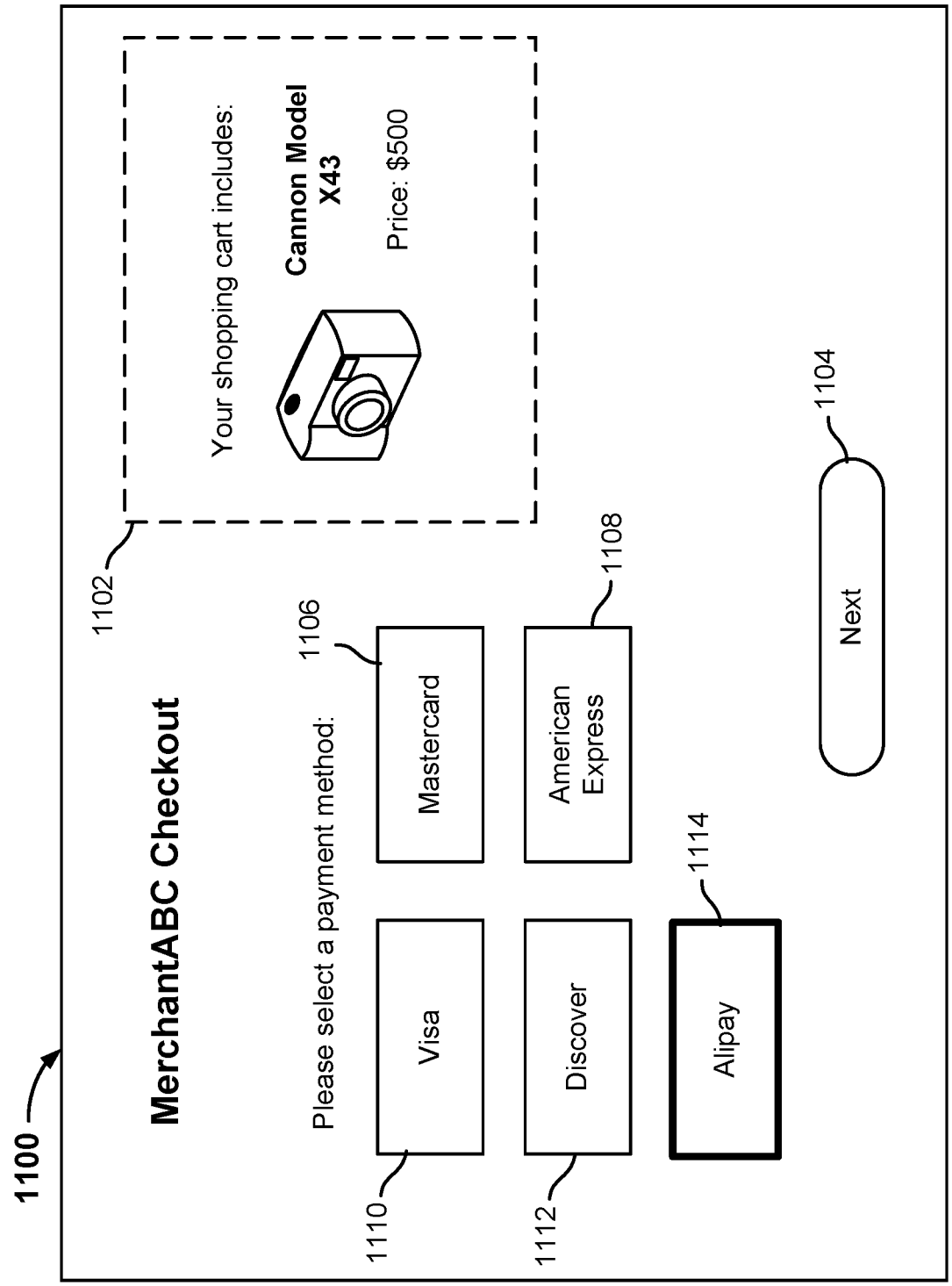
FIG. 11 is a diagram showing an example of a user interface prompting for a payment method selection associated with a checkout process of an e-commerce website.

FIG. 11 is a diagram showing an example of a user interface prompting for a payment method selection associated with a checkout process of an e-commerce website. In the example, user interface 1100 can be presented to a user (e.g., by a web browser executing at a client device) who has selected to purchase a product with MerchantABC. In the example, the product to be purchased is described in shopping cart area 1102 as a Cannon Model X43 camera that costs $500. In the example, MerchantABC's server may be integrated with that of at least some of the card management services (e.g., Visa®, Mastercard®, Discover®, and American Express®) such that MerchantABC's server can directly receive payments from customers who have been issued physical credit cards and/or debit cards from such card management services. However, while MerchantABC's server has not been integrated with a cardless payment server associated with an online payment platform (e.g., Alipay®), due to the arranged coordination between the cardless payment server associated with an online payment platform and a card management server associated with at least one card management service, in accordance with some embodiments, a user is enabled to make a payment for the transaction using his or her account with the online payment platform. For example, the cardless payment server may coordinate with one or more of the card management servers that have been traditionally integrated with the server of MerchantABC and also have been configured to cooperate with the cardless payment server. The user involved in the transaction may not be aware of the coordination between the cardless payment server and the card management server and in any case, need not have the option to select which card management server, if more than one are integrated with the MerchantABC's server, with which the transaction is to proceed. Rather, the one or more card management servers, if more than one are integrated with the MerchantABC's server, that are used to complete the transaction is determined based on which cardless payment servers have established arrangements with the online payment platform/cardless payment server.

In the example, a user may select a button associated with the desired payment method that is accepted by MerchantABC for this transaction. The possible payment methods include card management services, Visa®, Mastercard®, Discover®, and American Express®, which correspond respectively to buttons 1110, 1106, 1112, and 1108. The possible payment methods also include an online payment platform Alipay®, which corresponds to button 1114. In the example, the user has previously created an account with Alipay® and chooses to make the payment for this transaction with Alipay® by selecting button 1114 and then selecting "Next" button 1104. In response, process 400 of FIG. 4 is performed by the cardless payment server and a user interface such as FIG. 12, for example, is displayed at the web browser.

Figure 12:
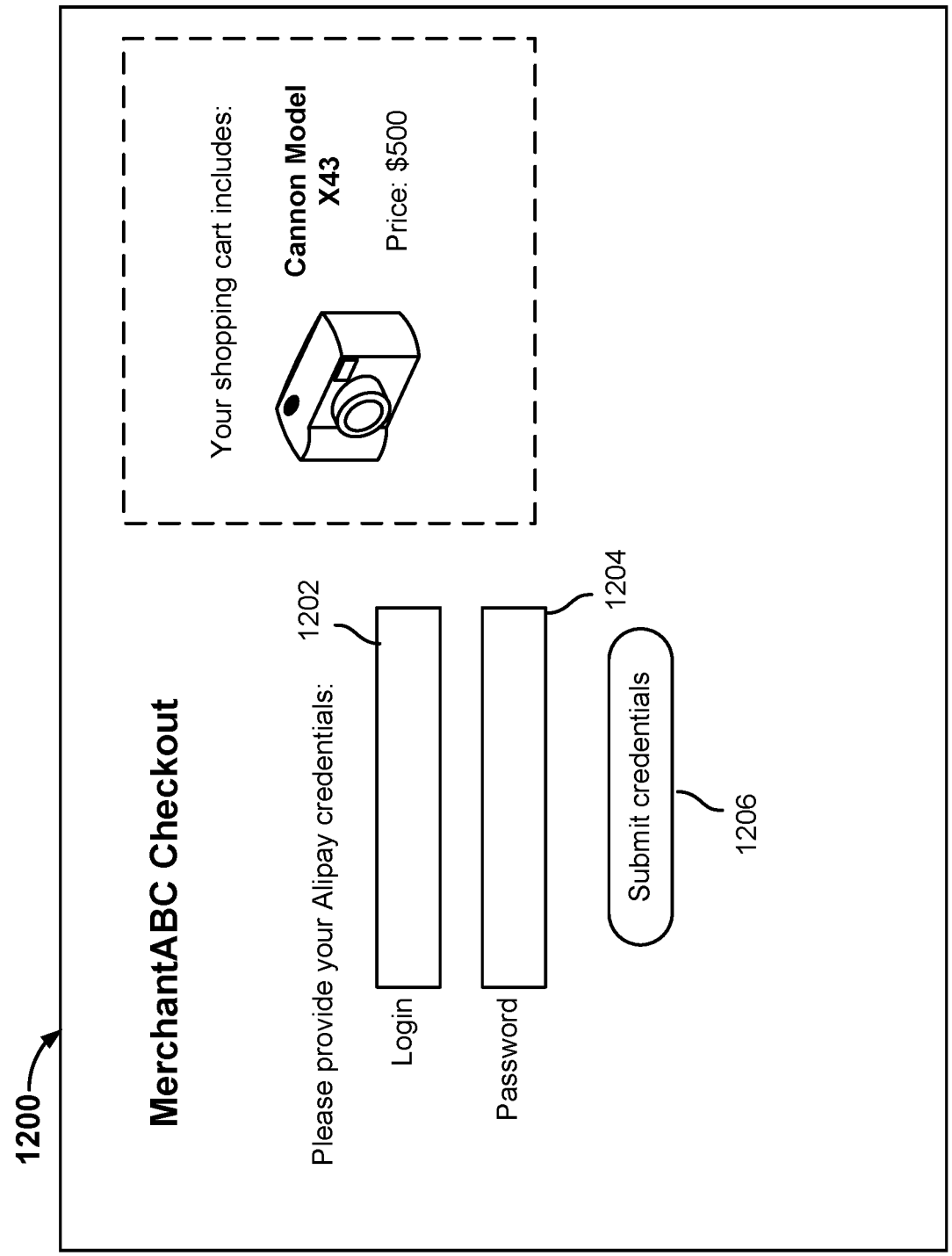
FIG. 12 is a diagram showing an example of a user interface prompting for user credentials associated with the online payment platform that was selected to be used to complete a transaction.

FIG. 12 is a diagram showing an example of a user interface prompting for user credentials associated with the online payment platform that was selected to be used to complete a transaction. In the example, user interface 1200 can be presented to a user in response to the user selection at user interface 1100 of FIG. 11 to complete the transaction with the user's Alipay®. User interface 1200 prompts the user to input his or her credentials of login name and password to his or her previously created Alipay® account at respective input fields of 1202 and 1204. After the user inputs his or her credentials, the user can select "Submit credentials" button 1206. In response, process 500 of FIG. 5 is performed by the cardless payment server.

Figure 13:
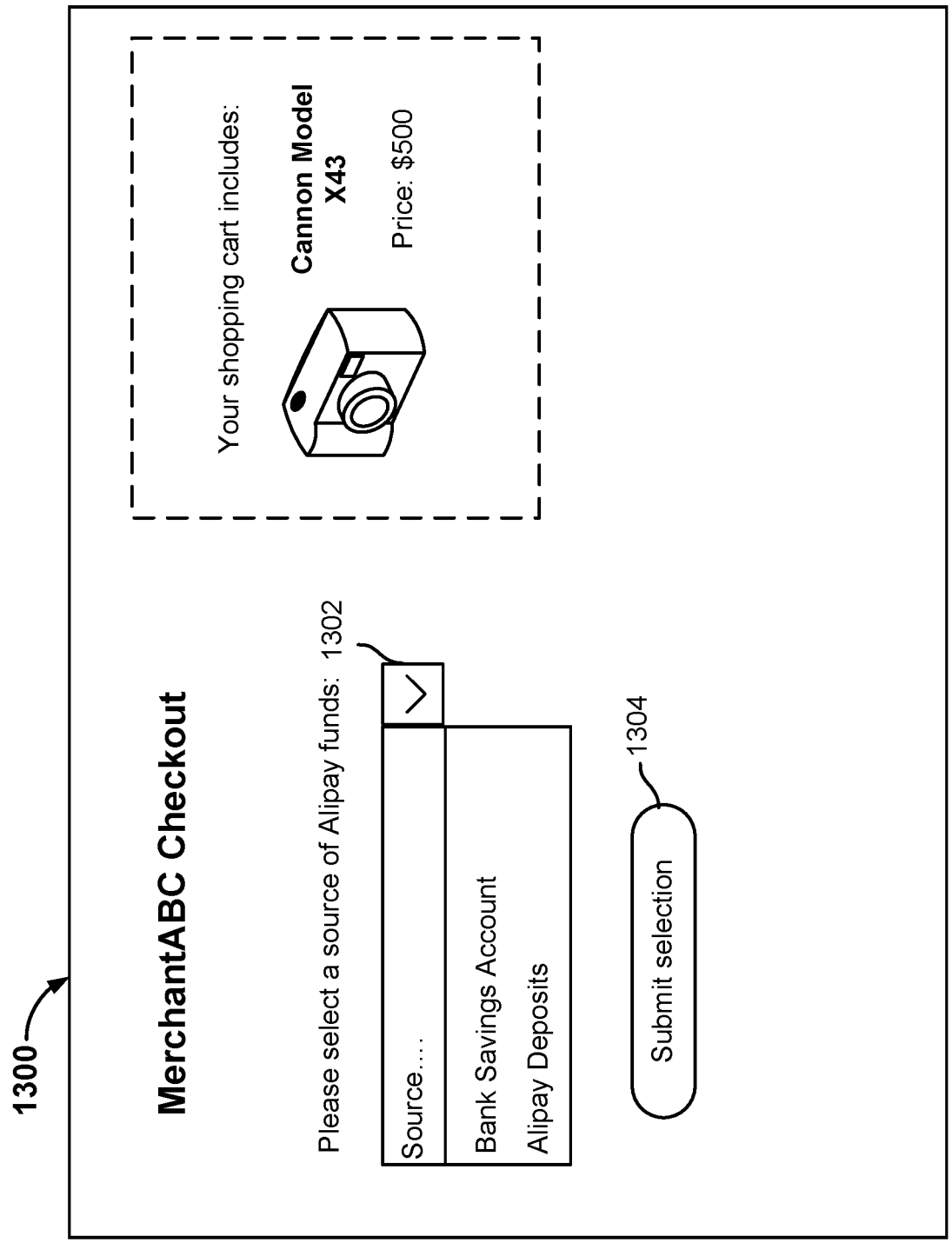
FIG. 13 is a diagram showing an example of a user interface prompting for a selection of a source of user funds to be applied to a transaction.

FIG. 13 is a diagram showing an example of a user interface prompting for a selection of a source of user funds to be applied to a transaction. In the example, user interface 1300 can be (optionally) presented to a user in response to the user submission of his or her Alipay® account credentials at user interface 1200 of FIG. 12. In the example, user interface 1300 is presented because the user credentials were authenticated. User interface 1300 prompts the user to select a desired source of funds to apply to the transaction from multiple sources previously linked to the user's Alipay® account. For example, the user can select one such source of funds (e.g., either "Bank Savings Account" or "Alipay Deposits") from pull down menu 1302. After the user selects the desired source of funds to apply to the transaction, the user can select "Submit selection" button 1304. For example, the user selection of a source of funds to be applied to a transaction may be received before or during process 500 of FIG. 5 being performed by the cardless payment server.

By selecting to pay with his or her Alipay® account to complete the transaction with MerchantABC, the cardless payment server associated with Alipay® coordinates with a card management server that has been configured to coordinate with the cardless payment server to generate a virtual card value corresponding to this transaction. The card management server will treat the virtual card value as being associated with a new virtual card with the transaction amount of $500 as the virtual card's limit and authorize MerchantABC server's request to charge $500 for the transaction, thereby completing the transaction. After MerchantABC server determines that the transaction has been completed (e.g., the transaction amount has been successfully charged to a virtual card), the MerchantABC server may send data to the user's web browser associated with transaction completion information, as described in FIG. 14, below.

Figure 14:
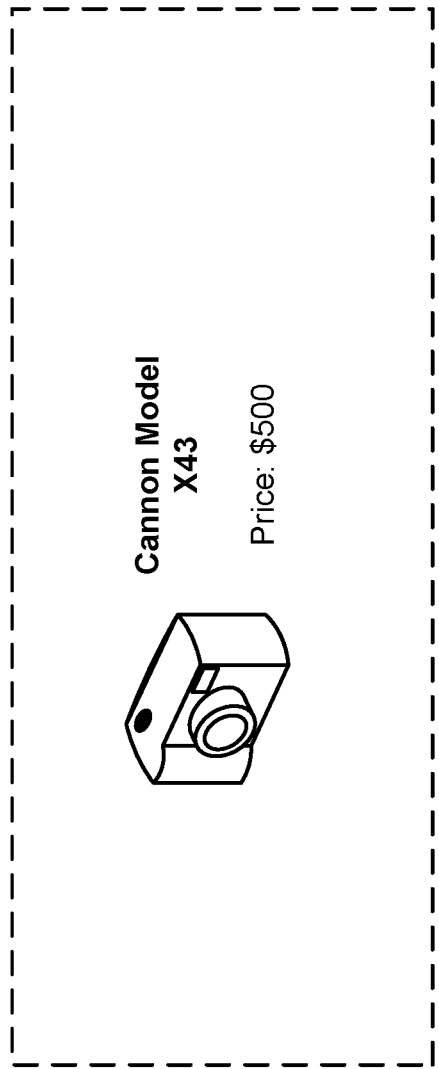
FIG. 14 is a diagram showing an example of a user interface presenting transaction completion information.

FIG. 14 is a diagram showing an example of a user interface presenting transaction completion information. In the example, user interface 1400 can be presented to a user in response to the completion of the user's payment of the purchase of the Cannon Model X43 camera with his or her Alipay® account.

As shown in the example of FIGS. 11 through 14, a user can select to pay for a transaction with his or her online payment platform account. Then, the cardless payment server associated with the online payment platform will automatically coordinate with a card management server traditionally integrated with the merchant's server to complete the transaction by using a virtual card value, all in a manner that can be transparent to the user such as described by process 500 of FIG. 5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A cardless payment server, comprising:
one or more computer processors configured to:
receive, from a web browser associated with a client device, a payment request associated with a transaction and a merchant server, wherein the payment request includes a transaction amount corresponding to the transaction;
generate a virtual card value that is unique to the transaction between the client device and a website associated with the merchant server;
send a storing request to a card management server for the card management server to store the virtual card value and the transaction amount;
generate a merchant-related locator that includes the virtual card value and identifying information associated with the merchant server;
send the merchant-related locator to the client device, wherein the merchant-related locator comprises at least the virtual card value, the transaction amount, and a signature associated with the merchant server, wherein the signature associated with the merchant server comprises encrypted data, wherein the merchant-related locator is used to cause the web browser associated with the client device to send to the merchant server a request that includes the virtual card value, the transaction amount, and the signature, wherein the request is used by the merchant server to:
authenticate a source that generated the merchant-related locator by decrypting the signature associated with the merchant server using a locally stored key; and
send a pre-authorization request to the card management server to cause the card management server to complete the transaction including by storing data indicating an authorization of a charge determined based at least in part on the transaction amount on the virtual card value; and
receive, from the card management server, a request to transfer the transaction amount corresponding to the transaction identified by the virtual card value from a user account at a payment platform associated with the cardless payment server to a funds account associated with the merchant server; and
one or more memories coupled to the one or more computer processors and configured to provide the one or more computer processors with instructions.

2. The cardless payment server of claim 1, wherein the one or more computer processors are further configured to:

determine a source of funds associated with the user account associated with the cardless payment server to be applied to the transaction; and issue a request to transfer the transaction amount from the determined source of funds to the funds account associated with the merchant server.

3. The cardless payment server of claim 1, wherein the one or more computer processors are further configured to:
send login page data to the web browser associated with the client device;
in response to the sending of the login page data, receive, from the web browser associated with the client device, credentials associated with the user account associated with the cardless payment server; and
authenticate the credentials prior to generating the virtual card value that is unique to the transaction, wherein the virtual card value is generated in response to the credentials associated with the user account being authenticated.

4. The cardless payment server of claim 1, wherein to generate the virtual card value that is unique to the transaction includes to:
determine a first value based at least in part on information associated with the user account at the payment platform associated with the cardless payment server;
determine a second value based at least in part on information associated with an issuer, wherein the issuer is associated with the cardless payment server;
determine a third value such that a concatenation of the first value, the second value, and the third value is a unique value; and
generate the virtual card value based at least in part on the first value, the second value, and the third value.

5. The cardless payment server of claim 1, wherein the one or more computer processors are further configured to store a transaction identifier corresponding to the virtual card value.

6. The cardless payment server of claim 1, wherein the storing request to the card management server includes authentication information associated with the cardless payment server.

7. The cardless payment server of claim 1, wherein the card management server is configured to store the virtual card value and the transaction amount as information associated with a new virtual card, wherein a limit associated with the new virtual card is set to the transaction amount.

8. The cardless payment server of claim 1, wherein the merchant server is configured to receive a pre-authorization confirmation from the card management server in response to the pre-authorization request and wherein the merchant server is configured to store transaction completion information in response to the pre-authorization confirmation.

9. The cardless payment server of claim 1, wherein the one or more computer processors are configured to:
receive a refund request associated with the transaction, wherein the refund request includes the virtual card value;
determine a transaction identifier corresponding to the virtual card value based at least in part on stored mappings between transaction identifiers and virtual card values;
retrieve stored data associated with the transaction identifier; and
generate a request to transfer funds from the funds account associated with the merchant server to a source of user funds based at least in part on the retrieved data.

10. The cardless payment server of claim 1, wherein the merchant-related locator comprises a uniform resource locator (URL).

11. The cardless payment server of claim 10, wherein the merchant-related locator further comprises a redirection instruction.

12. A method, comprising:
receiving, from a web browser associated with a client device, a payment request associated with a transaction and a merchant server, wherein the payment request includes a transaction amount corresponding to the transaction;
generating a virtual card value that is unique to the transaction between the client device and a website associated with the merchant server;
sending a storing request to a card management server for the card management server to store the virtual card value and the transaction amount;
generating a merchant-related locator that includes the virtual card value and identifying information associated with the merchant server;
sending the merchant-related locator to the client device, wherein the merchant-related locator comprises at least the virtual card value, the transaction amount, and a signature associated with the merchant server, wherein the signature associated with the merchant server comprises encrypted data, wherein the merchant-related locator is used to cause the web browser associated with the client device to send to the merchant server a request that includes the virtual card value, the transaction amount, and the signature, wherein the request is used by the merchant server to:
authenticate a source that generated the merchant-related locator by decrypting the signature associated with the merchant server using a locally stored key; and
send a pre-authorization request to the card management server to cause the card management server to complete the transaction including by storing data indicating an authorization of a charge determined based at least in part on the transaction amount on the virtual card value; and
receiving, from the card management server, a request to transfer the transaction amount corresponding to the transaction identified by the virtual card value from a user account at a payment platform associated with a cardless payment server to a funds account associated with the merchant server.

13. The method of claim 12, further comprising:
determining a source of funds associated with the user account associated with the cardless payment server to be applied to the transaction; and
issuing a request to transfer the transaction amount from the determined source of funds to the funds account associated with the merchant server.

14. The method of claim 12, further comprising:
sending login page data to the web browser associated with the client device;
in response to the sending of the login page data, receiving, from the web browser associated with the client device, credentials associated with the user account associated with the cardless payment server; and
authenticating the credentials prior to generating the virtual card value that is unique to the transaction, wherein the virtual card value is generated in response to the credentials associated with the user account being authenticated.

15. The method of claim 12, wherein generating the virtual card value that is unique to the transaction includes:
determining a first value based at least in part on information associated with the user account at the payment platform associated with the cardless payment server;
determining a second value based at least in part on information associated with an issuer, wherein the issuer is associated with the cardless payment server;
determining a third value such that a concatenation of the first value, the second value, and the third value is a unique value; and
generating the virtual card value based at least in part on the first value, the second value, and the third value.

16. The method of claim 12, further comprising storing a transaction identifier corresponding to the virtual card value.

17. The method of claim 12, wherein the storing request to the card management server includes authentication information associated with the cardless payment server.

18. The method of claim 12, wherein the card management server is configured to store the virtual card value and the transaction amount as information associated with a new virtual card, wherein a limit associated with the new virtual card is set to the transaction amount.

19. A merchant server, comprising:
one or more computer processors configured to:
receive a payment request associated with a transaction from a web browser associated with a client device, wherein the payment request includes a transaction amount associated with the transaction;
generate a cardless payment-related locator based at least in part on the payment request, wherein the cardless payment-related locator includes parameter values that are specific to the transaction;
send the cardless payment-related locator to the client device, wherein the cardless payment-related locator is used to redirect the web browser associated with the client device to a cardless payment server, wherein the cardless payment server is configured to generate a virtual card value used to complete the transaction with a card management server, wherein the virtual card value is unique to the transaction between the client device and a website associated with the merchant server;
receive an indication from the client device that the virtual card value and the transaction amount have been successfully stored by the card management server, wherein the indication from the client device is generated based at least in part on a merchant-related locator generated by the cardless payment server, wherein the indication comprises the virtual card value, the transaction amount, and a signature associated with the merchant server, wherein the signature associated with the merchant server comprises encrypted data, wherein the merchant-related locator is configured to cause the web browser associated with the client device to send the indication;
in response to the indication:
authenticate a source that generated the merchant-related locator by decrypting the signature associated with the merchant server using a locally stored key; and
send a pre-authorization request to the card management server to cause the card management server to complete the transaction including by storing data indicating an authorization of a charge determined based at least in part on the transaction amount on the virtual card value; and
receive a pre-authorization confirmation associated with the transaction from the card management server; and
one or more memories coupled to the one or more computer processors and configured to provide the one or more computer processors with instructions.

20. A card management server, comprising:
one or more computer processors configured to:
receive a storing request associated with a transaction from a cardless payment server, wherein the storing request includes a virtual card value and a transaction amount corresponding to the transaction, wherein the virtual card value is unique to the transaction between a client device and a website associated with a merchant server;
store the virtual card value and the transaction amount;
send a first indication that the virtual card value and the transaction amount have been successfully stored to the cardless payment server, wherein in response to the first indication, the cardless payment server is configured to generate and send a merchant-related locator to a web browser associated with the client device, wherein the merchant-related locator is used to cause the web browser associated with the client device to send to the merchant server a second indication that includes the virtual card value, the transaction amount, and a signature associated with the merchant server, wherein the signature associated with the merchant server comprises encrypted data, wherein the merchant server is configured to:
authenticate a source that generated the merchant-related locator by decrypting the signature associated with the merchant server using a locally stored key; and
send a pre-authorization request to the card management server in response to receiving the second indication, wherein the merchant-related locator comprises the virtual card value and the transaction amount;
receive the pre-authorization request from the merchant server, wherein the pre-authorization request includes the virtual card value and the transaction amount;
in response to the pre-authorization request, store data indicating an authorization of a charge determined based at least in part on the transaction amount on the virtual card value; and
send a pre-authorization confirmation to the merchant server; and
one or more memories coupled to the one or more computer processors and configured to provide the one or more computer processors with instructions.

* * * * *